United States Patent [19]

Minefuji

[11] Patent Number: 4,813,773
[45] Date of Patent: Mar. 21, 1989

[54] COPYING ZOOM LENS
[75] Inventor: Nobutaka Minefuji, Tokyo, Japan
[73] Assignee: Asahi Kogaku Kogyo Kabushiki Kaisha, Tokyo, Japan
[21] Appl. No.: 146,761
[22] Filed: Jan. 22, 1988
[30] Foreign Application Priority Data Jan. 22, 1987 [JP] Japan .................................. 62-12789
Jan. 22, 1987 [JP] Japan .................................. 62-12790

[51] Int. Cl.$^4$ .......................... G02B 15/00; G02B 9/62
[52] U.S. Cl. ..................................... 350/425; 350/464
[58] Field of Search ................................. 350/425, 464

[56] References Cited

U.S. PATENT DOCUMENTS 4,359,269 11/1982 Itoh ...................................... 350/425

Primary Examiner—John K. Corbin
Assistant Examiner—Rebecca D. Gass
Attorney, Agent, or Firm—Sughrue, Mion, Zinn, Macpeak and Seas

[57] ABSTRACT

A copying zoom lens comprising, in order from the object side, a first lens unit having a negative focal length, a second lens unit having a positive focal length and a third lens unit having a negative focal length. An axial space between the first and second lens units and an axial space between the second and third lens units are varied while moving an overall lens system and keeping constant a distance between the object and an image surface, thereby performing a zoom effect. The first lens unit is composed of a single negative meniscus first lens element having a concave surface directed to the object. The second lens unit is composed, in order from the object, of positive second lens element, a negative third lens element, a negative fourth lens element and a positive fifth lens element to constitute a three-lens element subsystem. The third lens unit is composed of a single negative meniscus sixth lens having a concave surface directed to the image surface. The second lens unit may be modified that it is composed, in order from the object, of a positive biconvex second lens element, a negative biconvex third lens element, and a positive biconvex fourth lens element to constitute a three-lens element subsystem.

10 Claims, 24 Drawing Sheets

COPYING ZOOM LENS

BACKGROUND OF THE INVENTION

The present invention relates to a zoom lens for an optical system of a copying machine or the like, and more particularly to a three-unit type copying zoom lens having a F-number of approximately 1:7 and enabling to covering a half view angle of approximately 20°, in which a distance between the object and the image may be kept constant.

Recently, there have been strong demands that copying lenses be miniaturized are made at low cost as copying machines have been made compact at low cost. Also, there are like needs for zoom lenses that are used for enlarging and reducing operation in the copying machines.

A three-unit copying lens is disclosed in Japanese Patent Application Laid-Open Nos. 57-67909 and 60-121414. However, such a zoom lens needs 8 to 10 lens elements, resulting in high cost. Thus, the zoom lens might not meet the recent requirement that a super-compact copying machine be made at low manufacture cost.

Another copying lens is proposed in Japanese Patent Application Laid-Open No. 61-140912 in order to meet the low cost requirement. However, this lens is composed of seven elements grouped into seven unit, and is of a wide angle type covering a half view angle of 25°. Therefore, this lens has a relatively large number of structural elements for the half view angle of about 20°, which could not attain the low cost requirement. This should be further improved.

SUMMARY OF THE INVENTION

Accordingly, in order to overcome the above-noted drawbacks or difficulties inherent in the prior art, an object of the present invention is to provide a copying zoom lens having a good performance and a large zoom ratio (magnification range of 0.6 to 0.6 to 1.4 times), and in which the number of structural elements is reduced to simplify the lens system while meeting the two requirements of the compactness and cost reduction.

According to the present invention, there is provided a copying zoom lens comprising, in order from the object side, a first lens unit having a negative focal length, a second lens unit having a positive focal length and a third lens unit having a negative focal length, wherein an axial space between said first and second lens units and an axial space between said second and third lens units are varied while moving an overall lens system and keeping constant a distance between the object and an image surface, thereby performing a zoom effect, said zoom lens characterized in that said first lens unit is composed of a single negative meniscus first lens element having a concave surface directed to the object, said second lens unit is composed, in order from the object, of a positive second lens element, a negative third lens element, a negative fourth lens element and a positive fifth lens element to constitute a four-lens element subsystem, said third lens unit is composed of a single negative meniscus sixth lens having a concave surface directed to the image surface, whereby the overall lens system is formed into a six-unit lens, said zoom lens satisfying the following conditions:

$$0.3 < f_{II}/f_M < 0.9 \tag{1}$$

where $f_M$ is the overall focal length at a unity magnification, and $f_{II}$ is the focal length of the second lens unit.

It is preferable that the first and sixth lens element that are the negative meniscus lenses of the first and third lens units meet the following conditions in order to further enhance the performance:

$$0.1 < r_1/f_1 < 0.45,\ 0.1 < -r_{12}/f_6 < 0.45 \text{ and} \tag{2}$$

$$-0.0002 < 1/(\nu_1 \cdot f_1) < 0,\ -0.0002 < 1/(\nu_6 \cdot f_6) < 0 \tag{3}$$

where $f_i$ is the focal length of the i-th lens element, $\nu_i$ is the Abbe number of the i-th lens element, and $r_i$ is the radius of curvature of the i-th lens surface counted from the object.

It is preferable that the second lens unit composed of the second, third, fourth and fifth lens elements meet the following conditions:

$$0 < \sum_{i=2}^{5} 1/(n_i \cdot f_i) < 0.008 \tag{4}$$

$$\left| \sum_{i=2}^{5} 1/(\nu_i \cdot f_i) \right| < 0.0002 \tag{5}$$

$$0.2 < f_2/f_{II} < 1.0,\ 0.2 < f_5/f_{II} < 1.0 \tag{6}$$

$$0.06 < (n_2 + n_5)/2 - (n_3 + n_4)/2 < 0.18,\ \text{and} \tag{7}$$

$$0.3 < r_5/r_4 < 0.9,\ \text{and}\ 0.3 < r_8/r_9 < 0.9 \tag{8}$$

where $n_i$ is the refractive index of the i-th lens at a d-line.

In addition, in the above-described lens system, it is preferable that the first, second and third lens elements be symmetrically arranged relative to the fourth, fifth and sixth elements, respectively.

According to another aspect of the present invention, there is provided a copying zoom lens comprising, in order from the object side, a first lens unit having a negative focal length, a second lens unit having a positive focal length and a third lens unit having a negative focal length, wherein an axial space between said first and second lens units and an axial space between said second and third lens units are varied while moving an overall lens system and keeping constant a distance between the object and an image surface, thereby performing a zoom effect, said zoom lens characterized in that said first lens unit is composed of a single negative meniscus first lens element having a concave surface directed to the object, said lens unit is composed, in order from the object, of a positive biconvex second lens element, a negative biconcave third lens element, and a positive biconvex fourth lens element to constitute a three-lens element subsystem, said third lens unit is composed of a single negative meniscus fifth lens having a concave surface directed to the image surface, whereby the overall lens system is formed into a five-unit lens, said zoom lens satisfying the following condition:

$$0.3 < f_{II}/f_M < 0.8. \tag{1'}$$

It is preferable that the first and fifth lens element that are the negative meniscus lenses of the first and third lens units meet the following conditions in order to further enhance the performance:

$$0.15 < r_1 f_1,\ 0.45,\ 0.15 < -r_{10}/f_5 < 0.45. \tag{2'}$$

$$-0.0002 < 1/(\nu_1 \cdot f_1) < 0, \quad -0.0002 < 1/(\nu_5 \cdot f_5) < 0. \quad (3')$$

It is preferable that the second lens unit composed of the second, third and fourth lens elements meet the following conditions:

$$0.002 < \sum_{i=2}^{4} 1/(n_i \cdot f_i) < 0.008 \quad (4')$$

$$\left| \sum_{i=2}^{4} 1/(\nu_i \cdot f_i) \right| < 0.0002 \quad (5')$$

$$0.5 < f_2/f_{II} < 0.9, \quad 0.5 < f_4/f_{II} < 0.9 \quad (6')$$

$$-0.02 < (n_2 + n_4)/2 - n_3 < 0.12, \text{ and} \quad (7')$$

$$0.06 < d_4/f_{II} < 0.14, \text{ and } 0.06 < d_6/f_{II} < 0.14. \quad (9)$$

In this embodiment, the first through fifth lens elements are symmetrical with respect to a center of the third lens element.

One of the most important feature of the present invention is that the second lens group may be composed of three or four lens elements, in contrast to the conventional system that needs a central lens unit composed of five to eight lens elements.

BRIEF DESCRIPTION OF THE DRAWINGS

In the accompanying drawings.

DETAILED DESCRIPTION OF THE CONDITIONS

Figure 1:
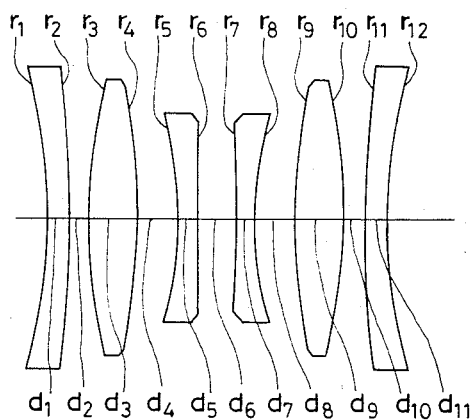
FIGS. 1, 5, 9, 13, 17, 21, 25, 29, 33, 37, 41 and 45 are cross-sectonal views of first through twelfth embodiments of the present invention, respectively.
Figure 2:
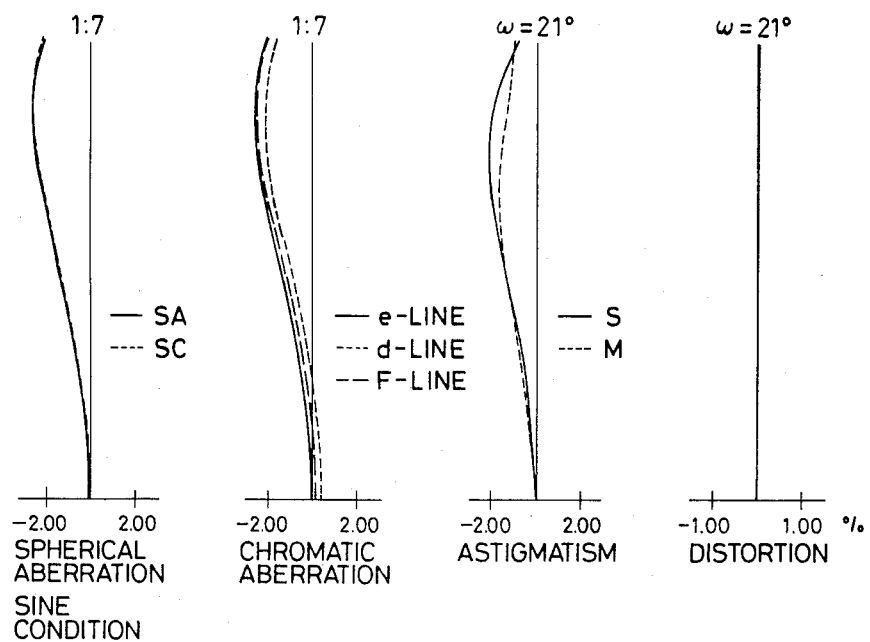
FIGS. 2, 6, 10, 14, 18, 22, 26, 30, 34, 38, 42 and 46 are graphs showing aberrations obtained in accordance with the first through twelfth embodiments of the invention at a unity magnification (1.0 time)
Figure 3:
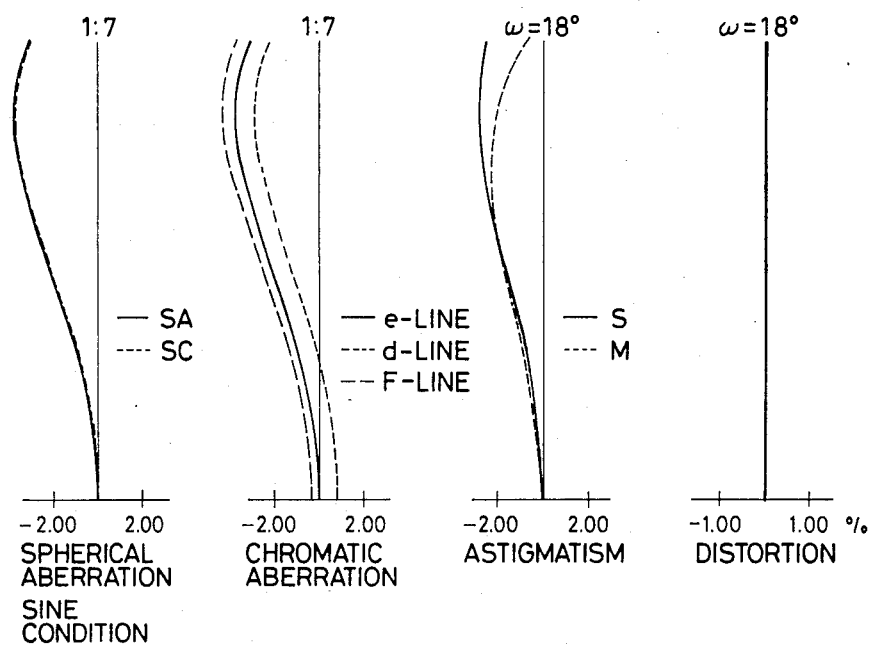
FIGS. 3, 7, 11, 15, 19, 23, 27, 31, 35, 39, 43 and 47 are graphs showing aberrations obtained in accordance with the first to twelfth embodiments of the invention at a magnification of 1.42 times.
Figure 4:
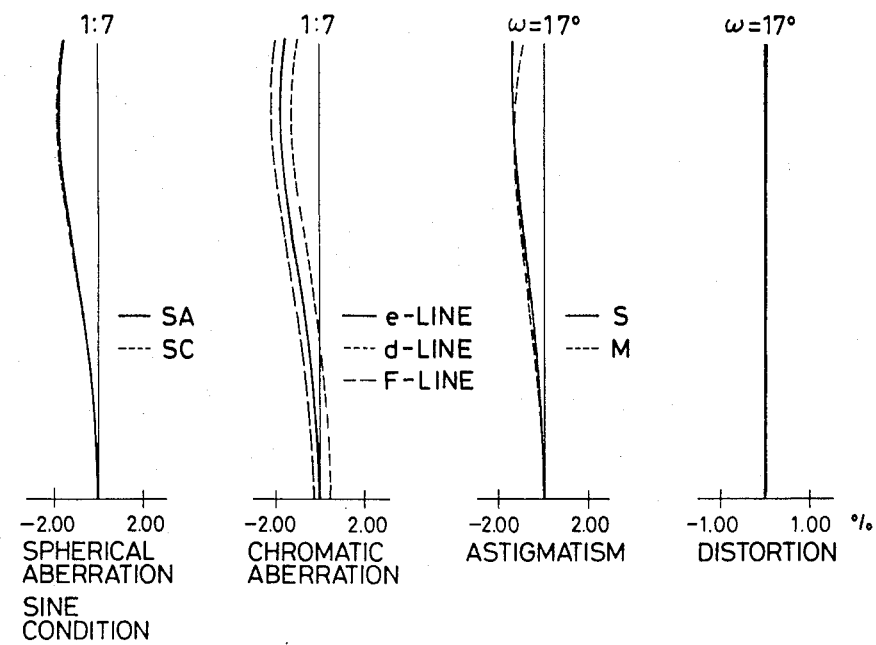
FIGS. 4, 8, 12, 16, 20, 24, 28, 32, 36, 40, 44 and 48 are graphs showing aberrations obtained in accordance with the first to twelfth embodiments of the invention at a magnification of 0.64 times.
Figure 5:
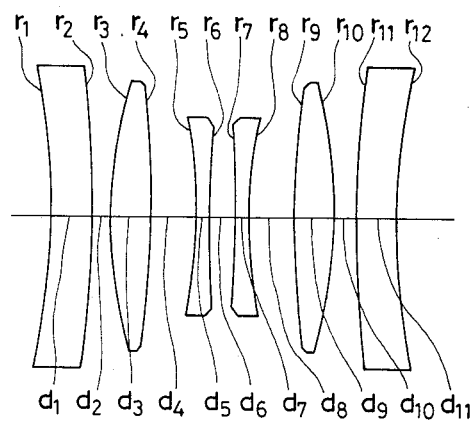
Figure 6:
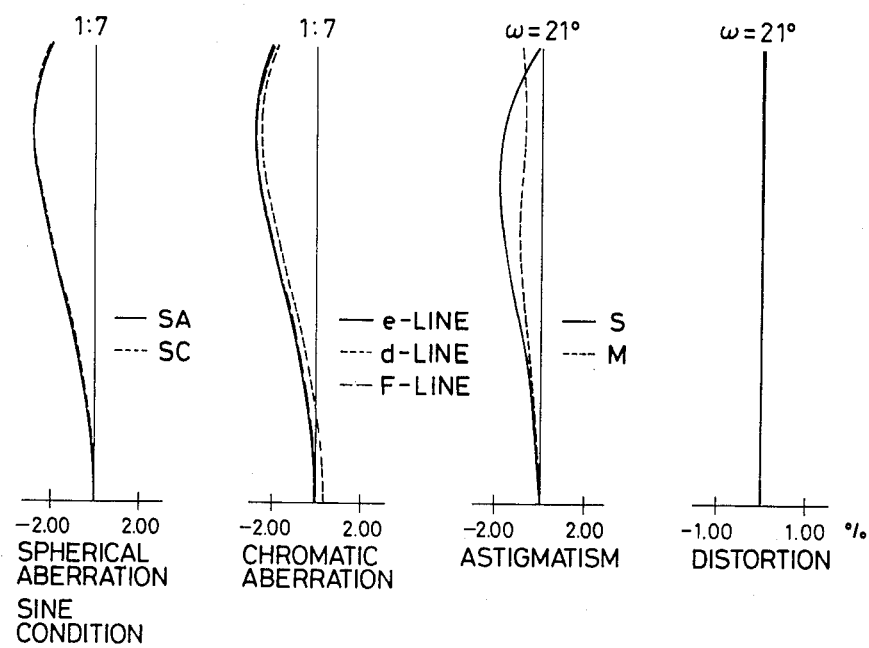
Figure 7:
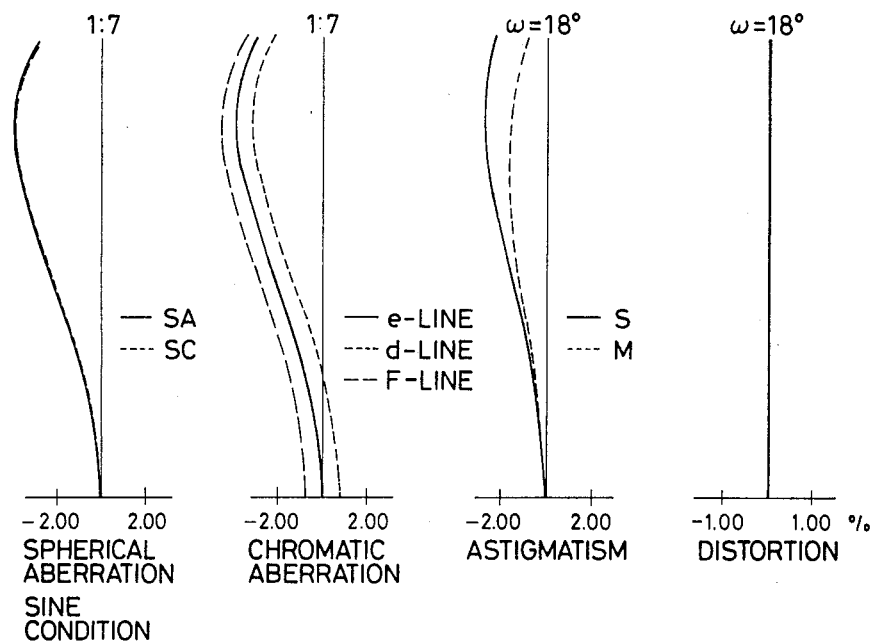
Figure 8:
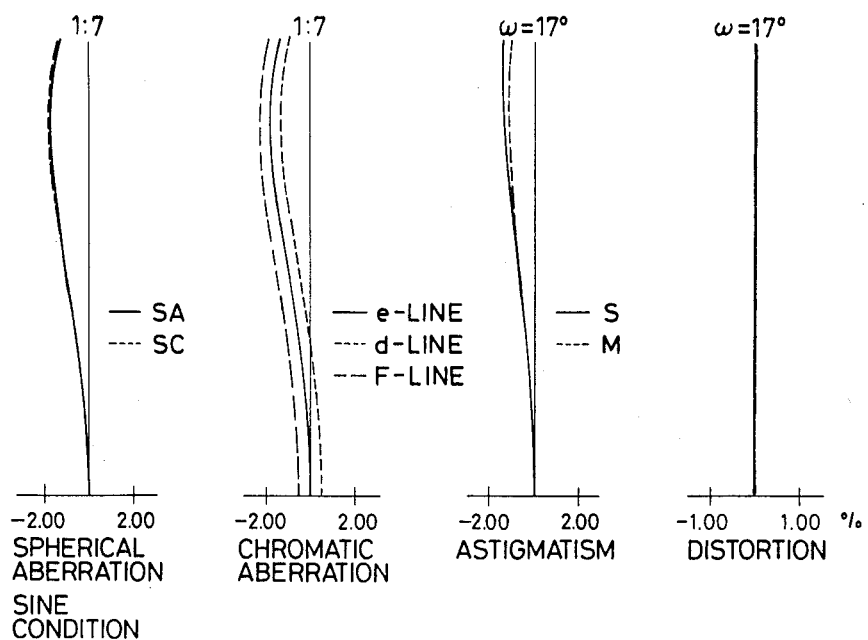
Figure 9:
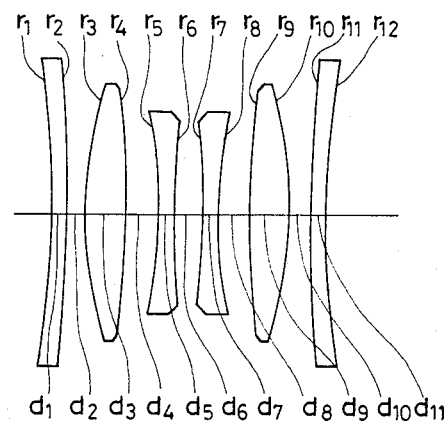
Figure 10:
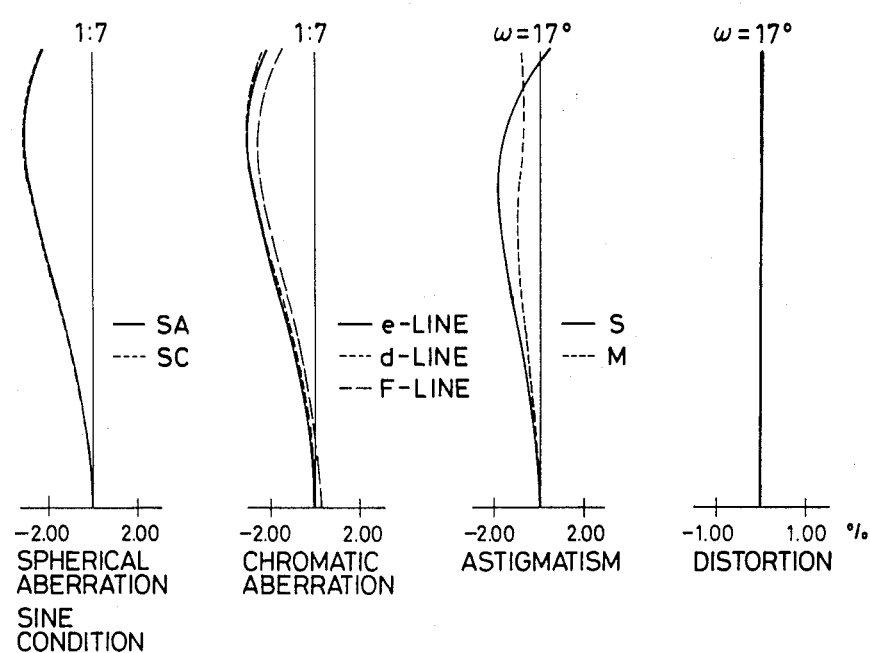
Figure 11:
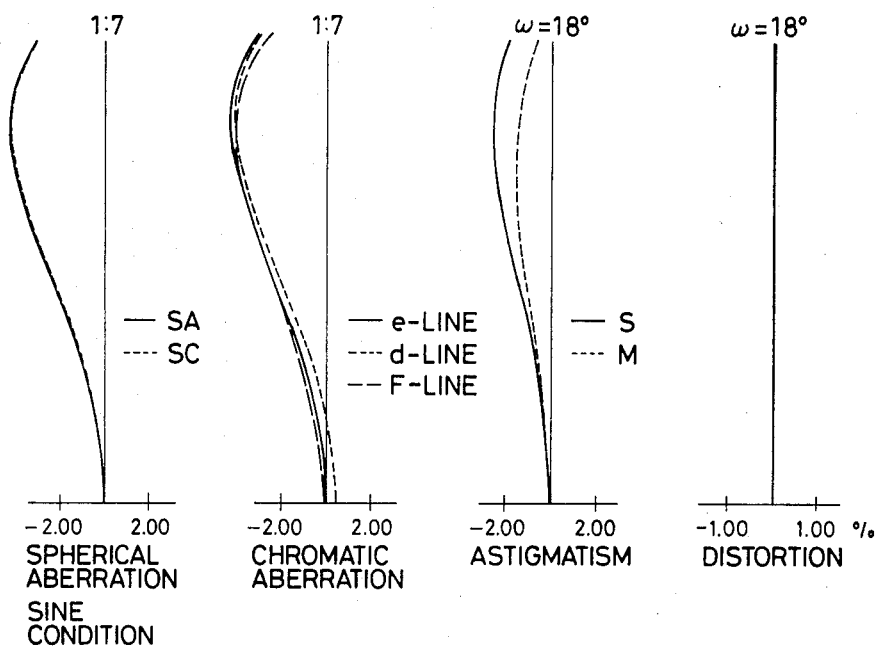
Figure 12:
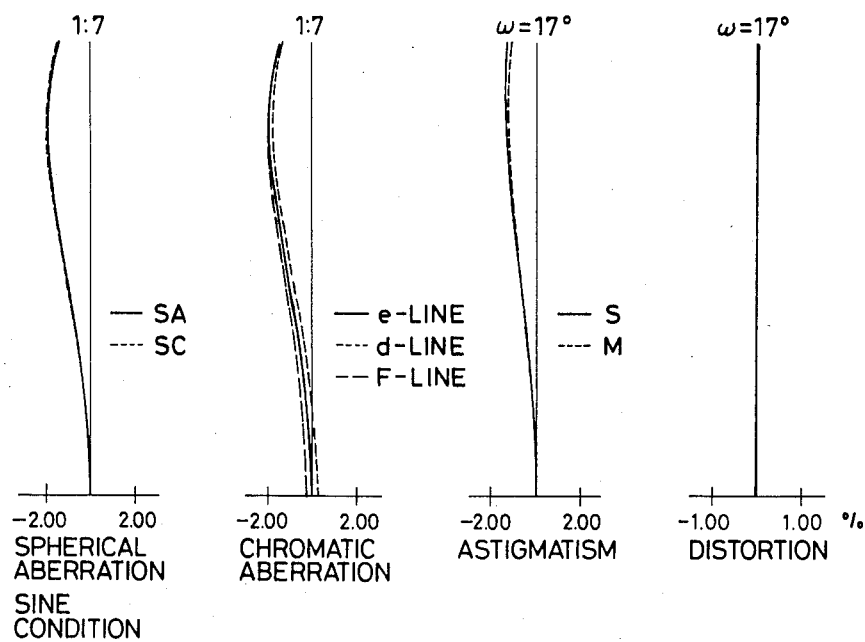
Figure 13:
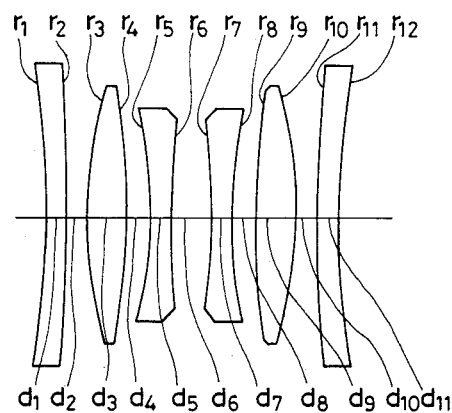
Figure 14:
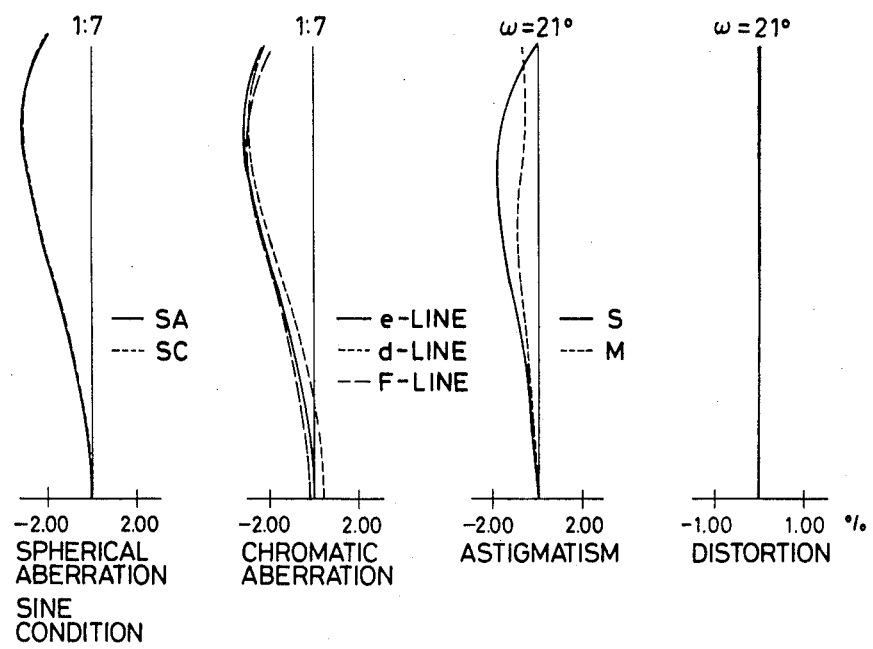
Figure 15:
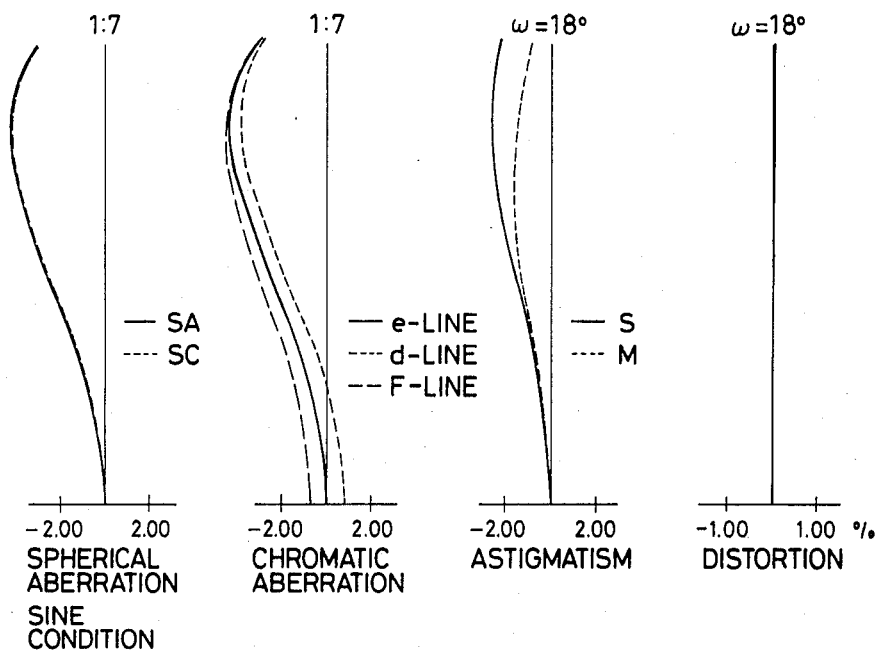
Figure 16:
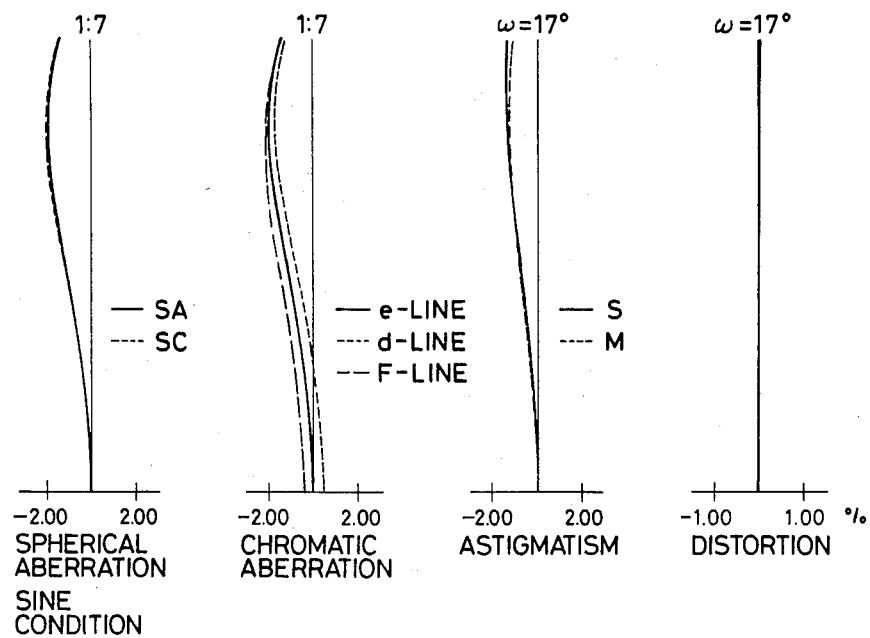
Figure 17:
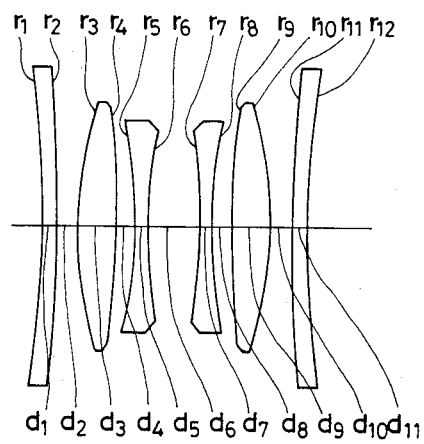
Figure 18:
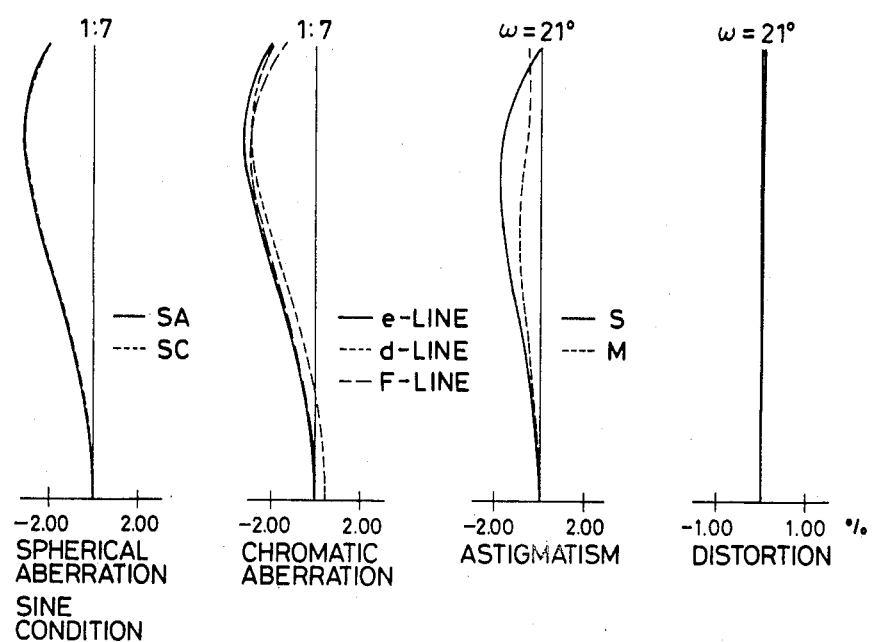
Figure 19:
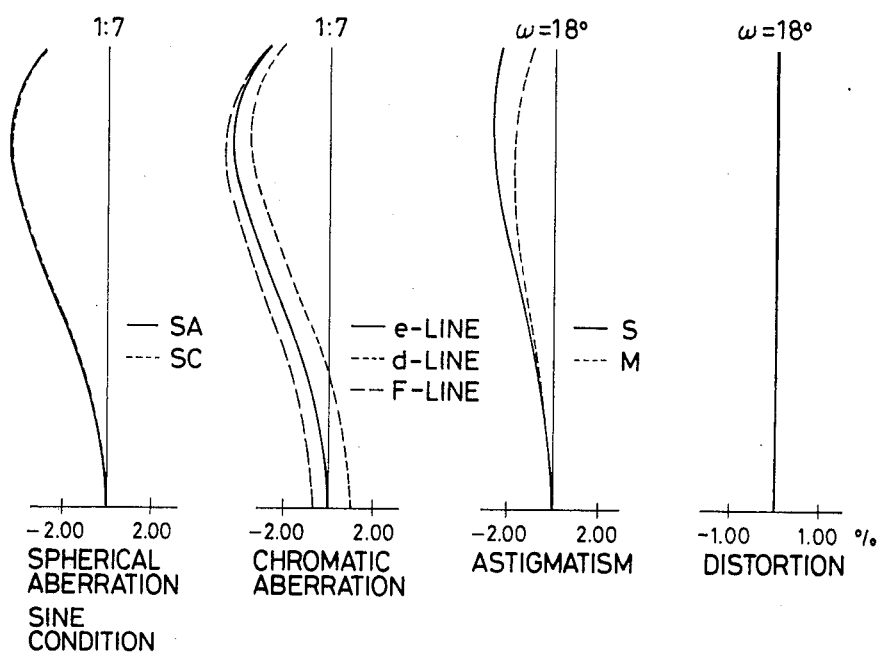
Figure 20:
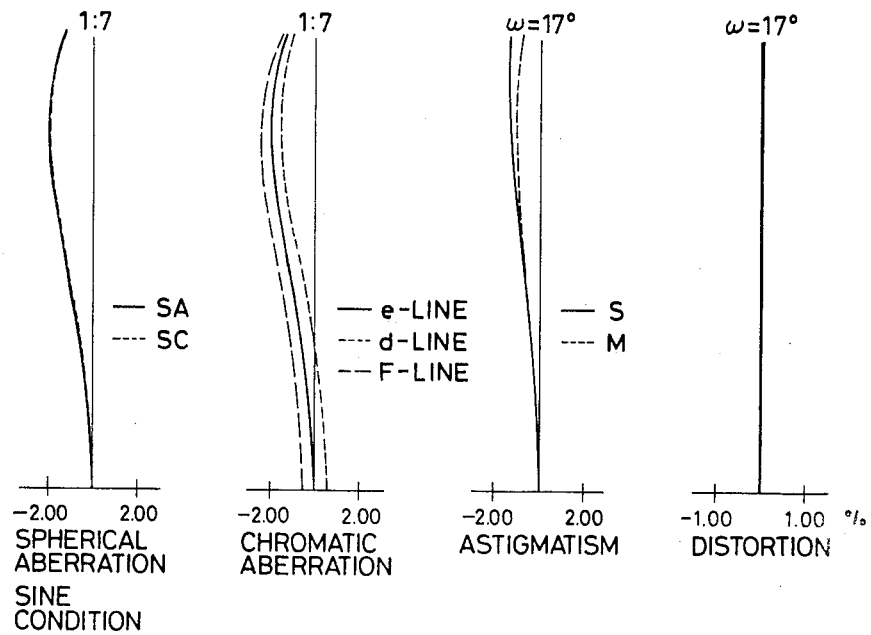
Figure 21:
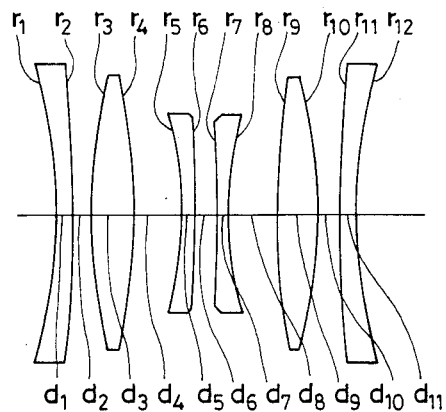
Figure 22:
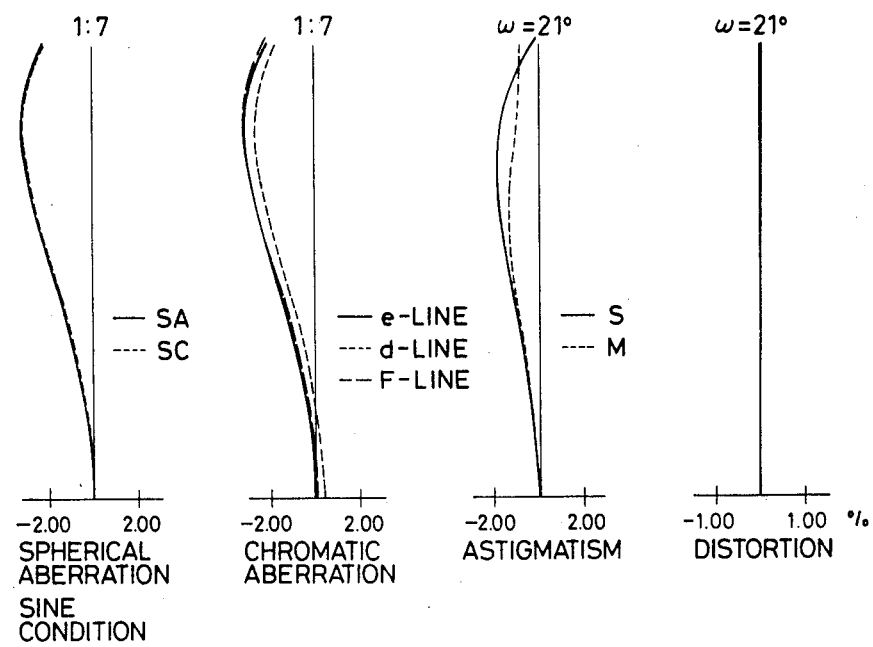
Figure 23:
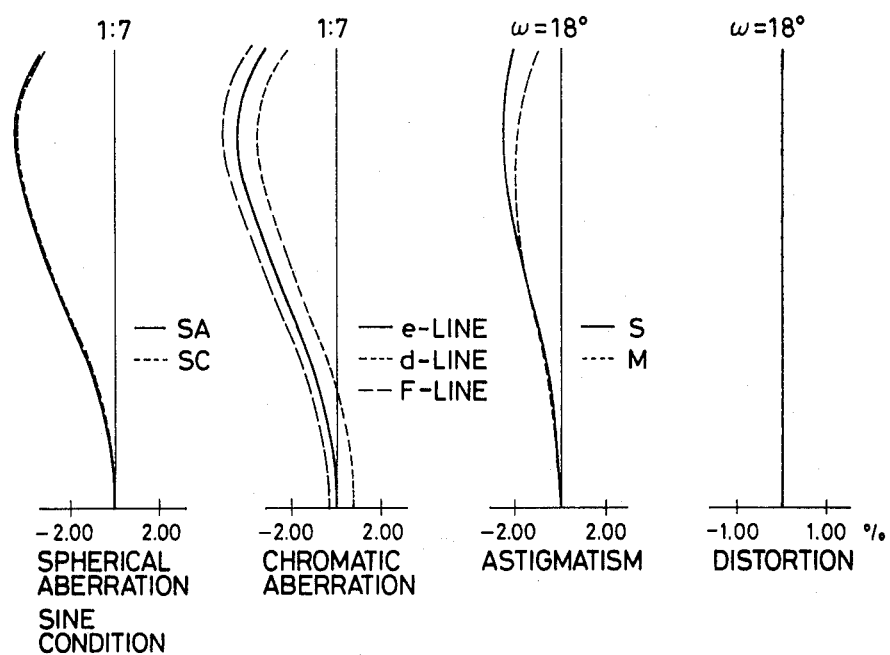
Figure 24:
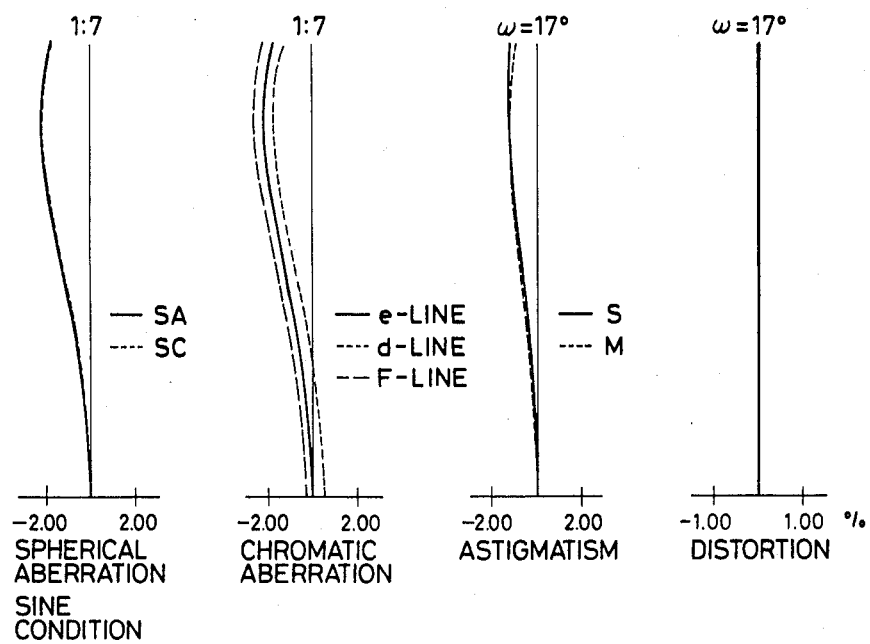
Figure 25:
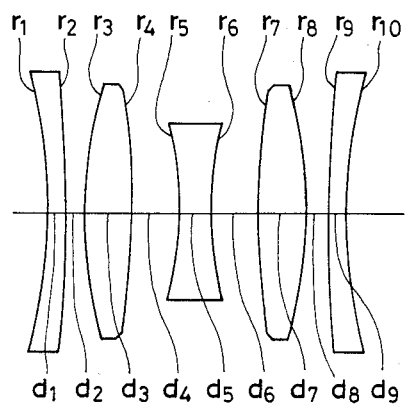
Figure 26:
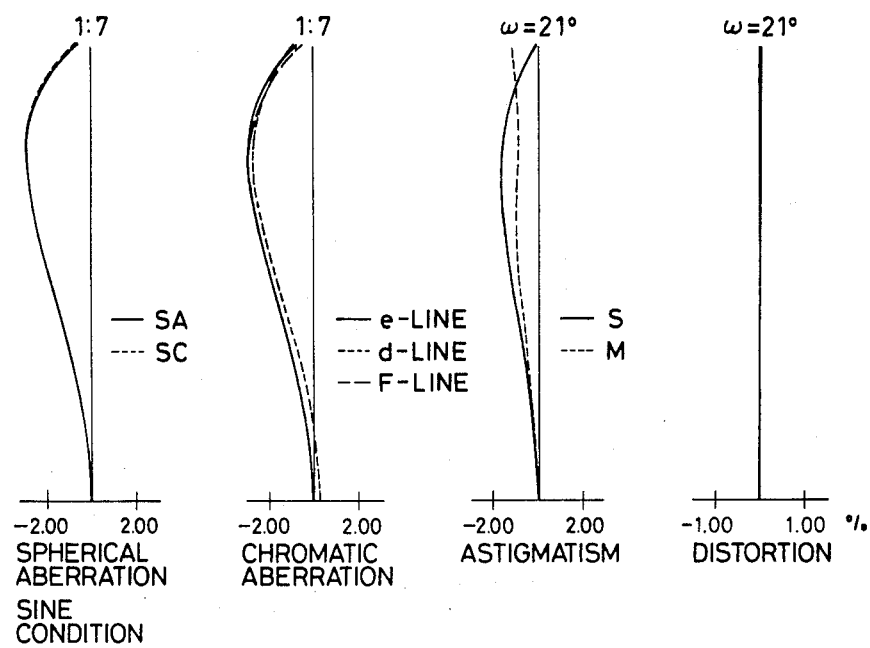
Figure 27:
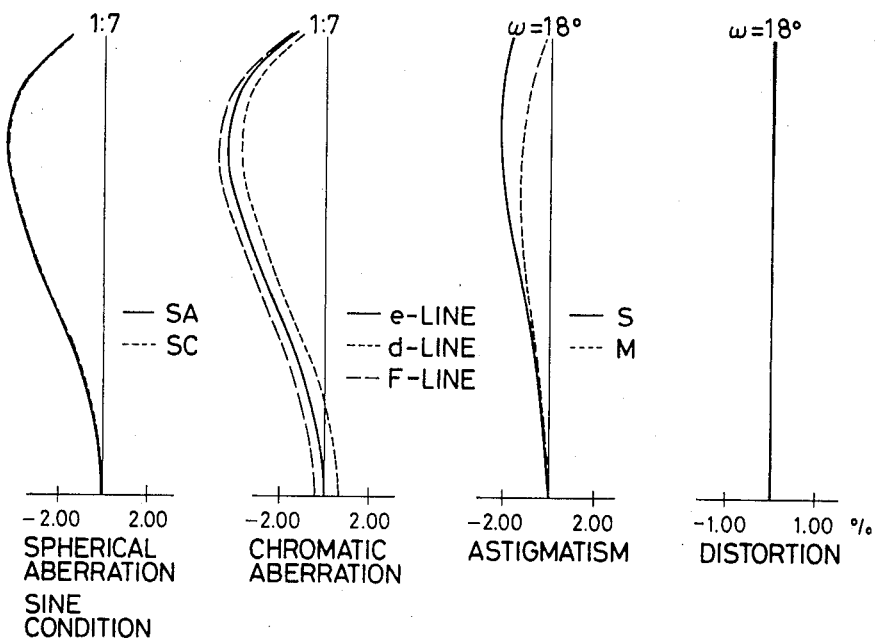
Figure 28:
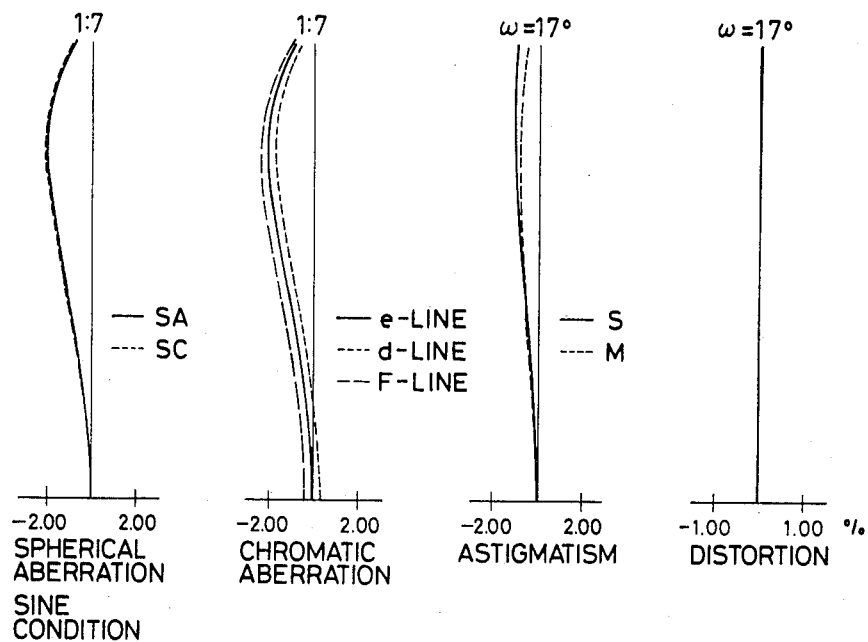
Figure 29:
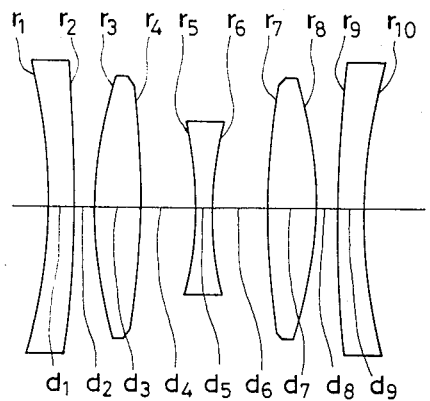
Figure 30:
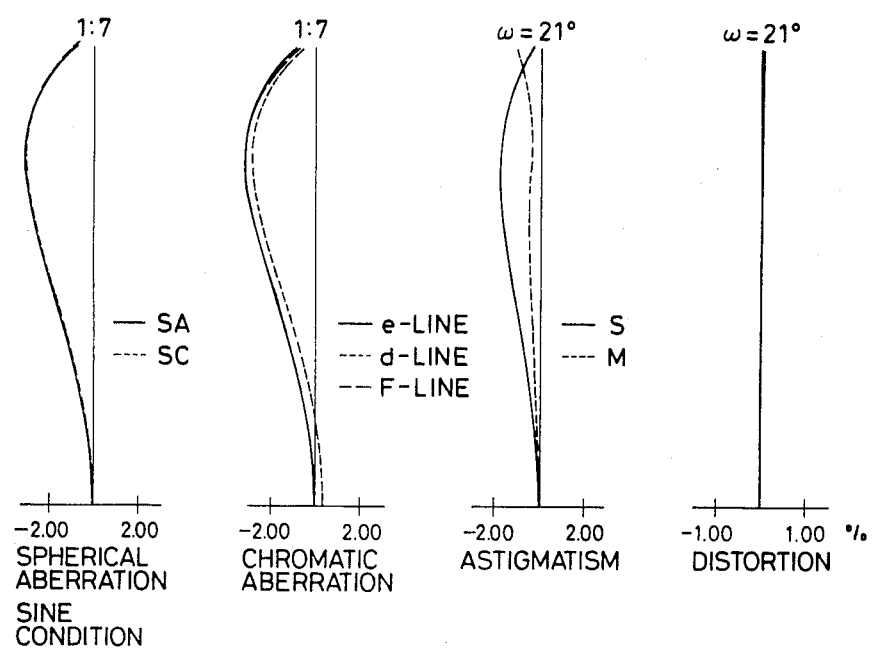
Figure 31:
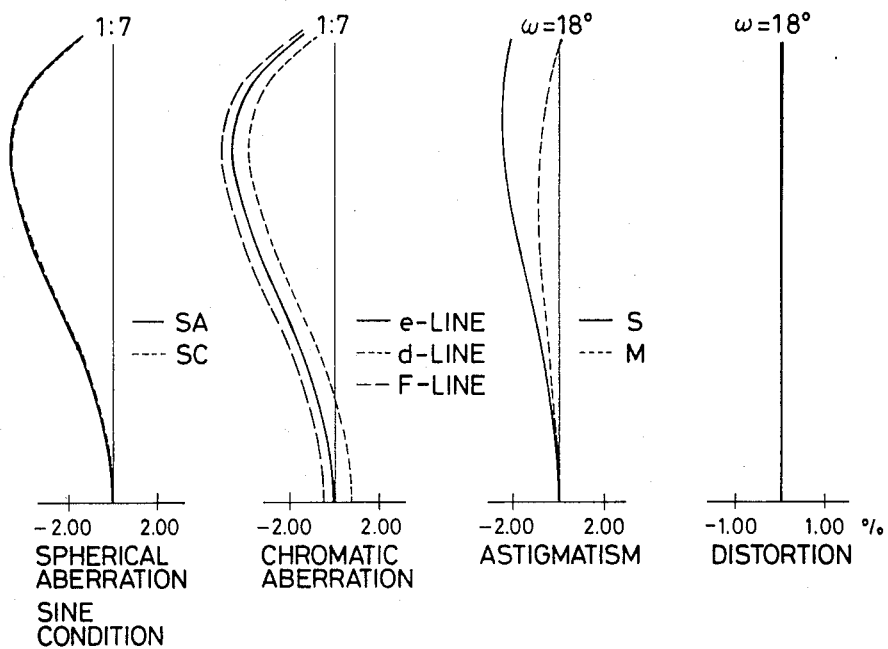
Figure 32:
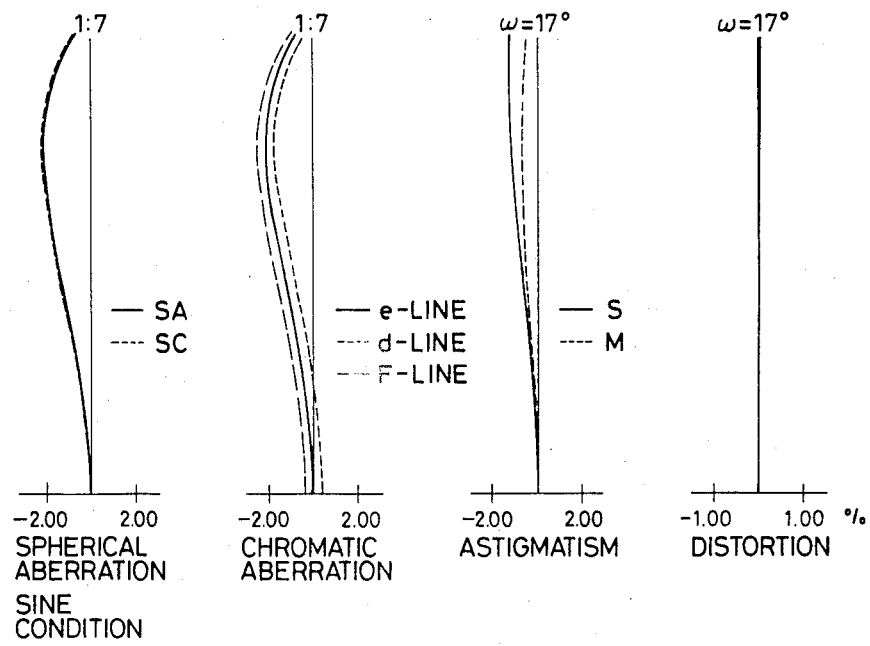
Figure 33:
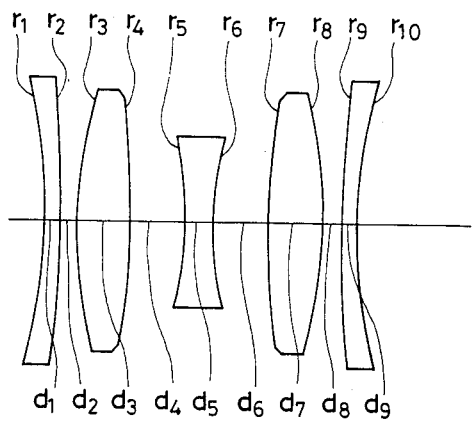
Figure 34:
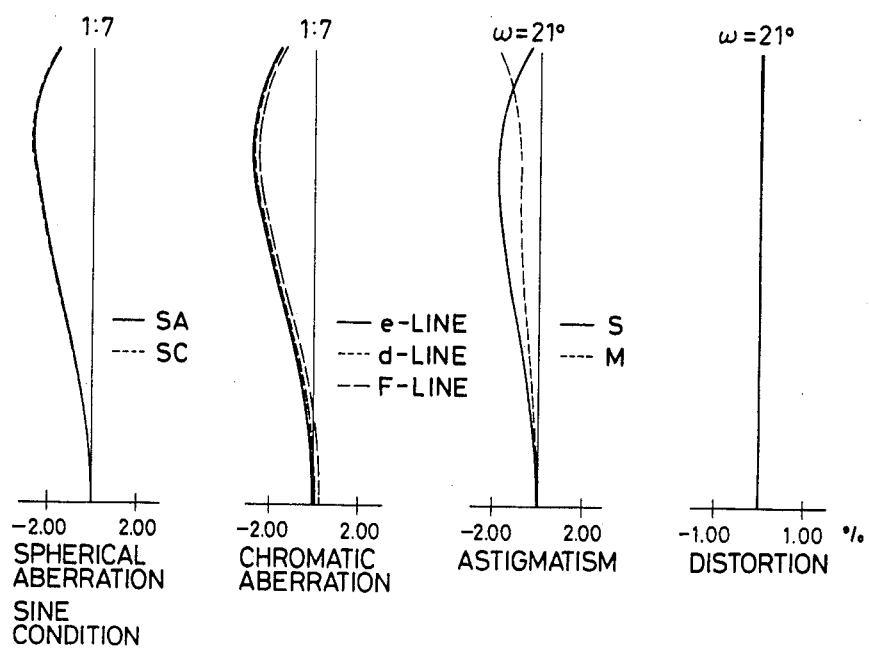
Figure 35:
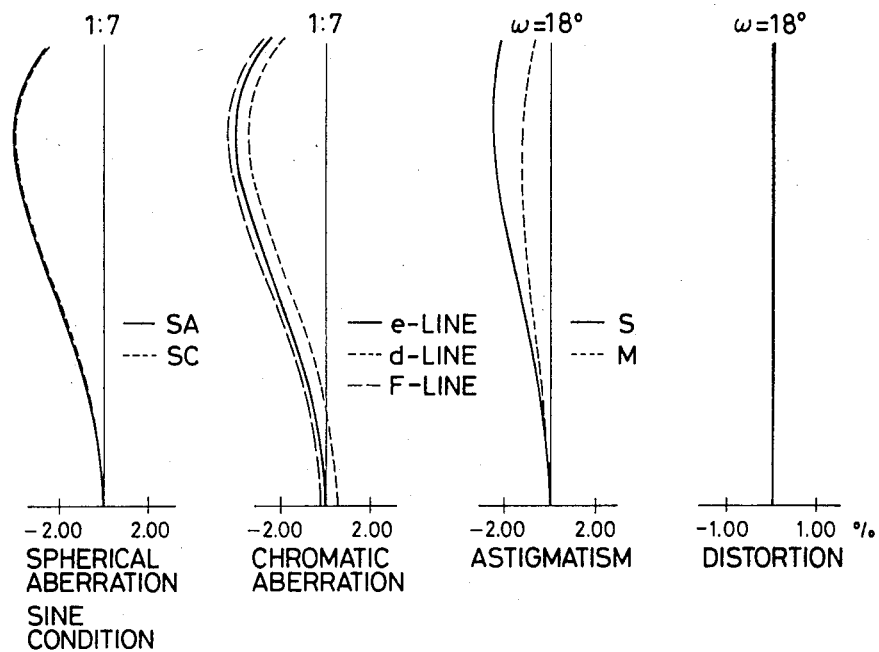
Figure 36:
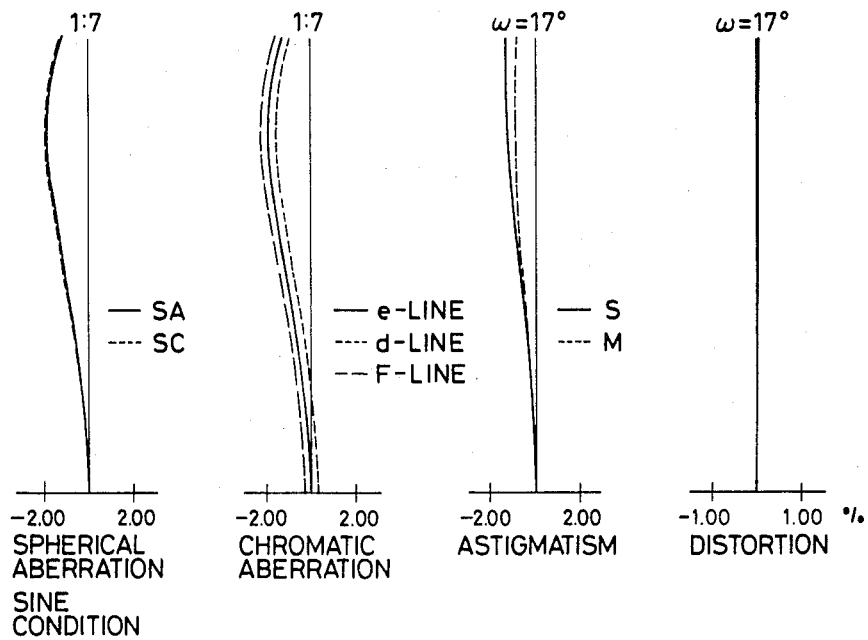
Figure 37:
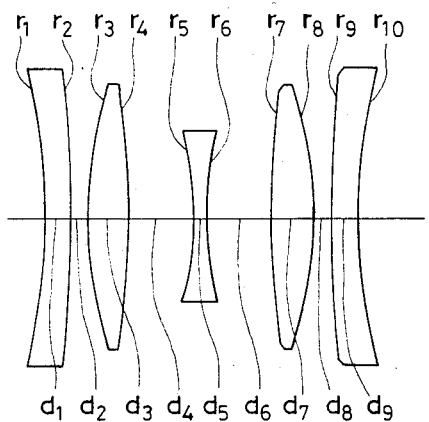
Figure 38:
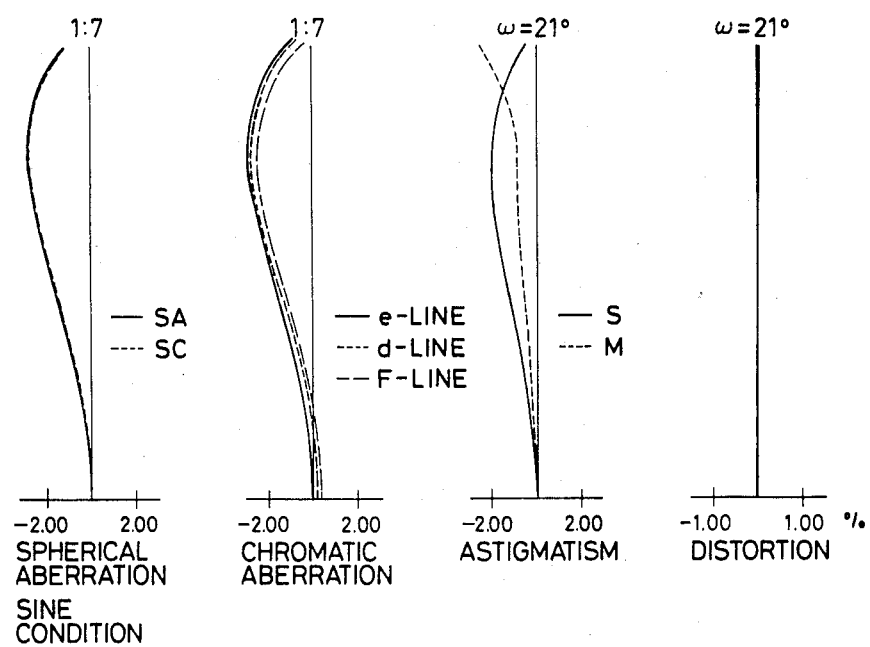
Figure 39:
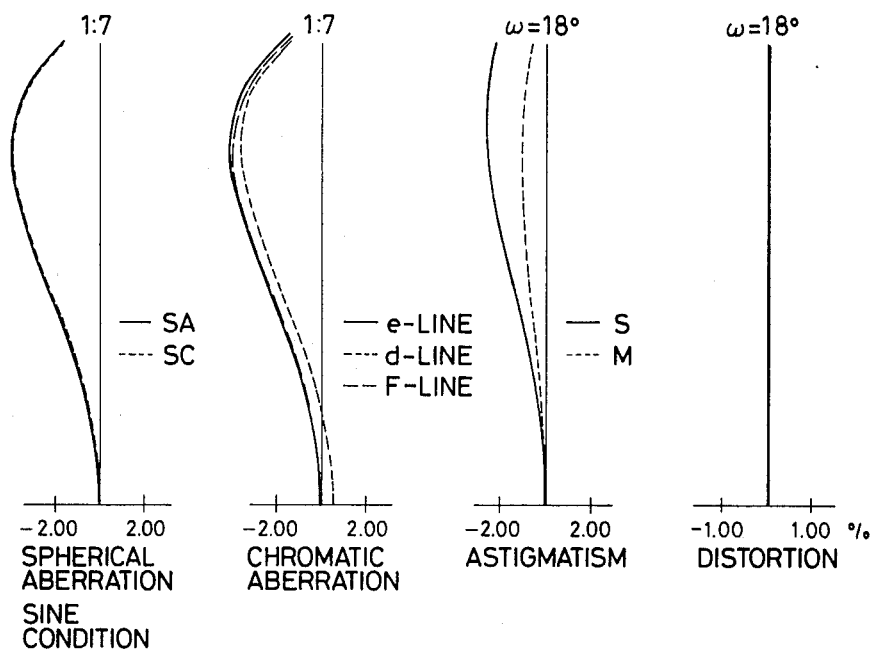
Figure 40:
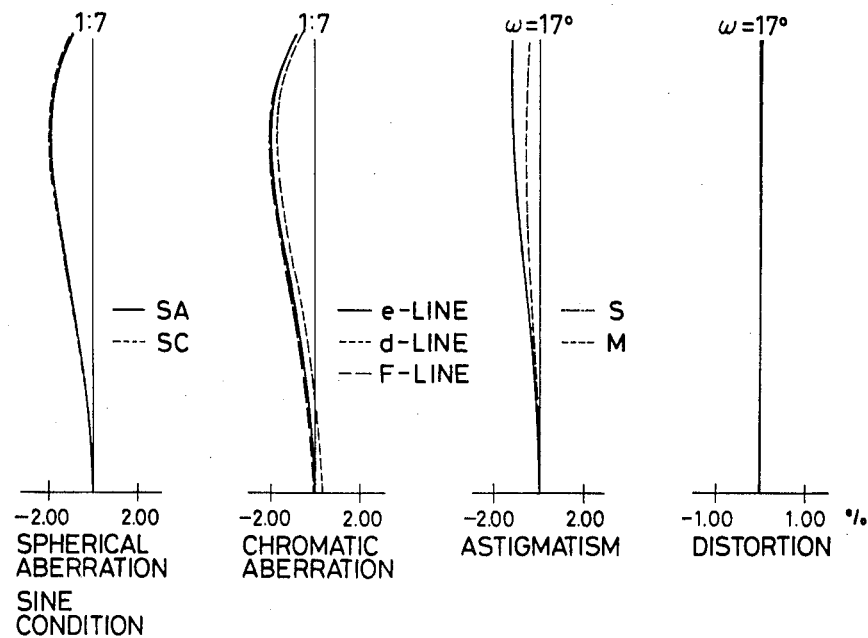
Figure 41:
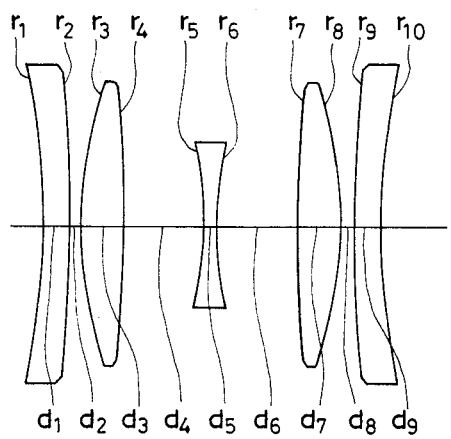
Figure 42:
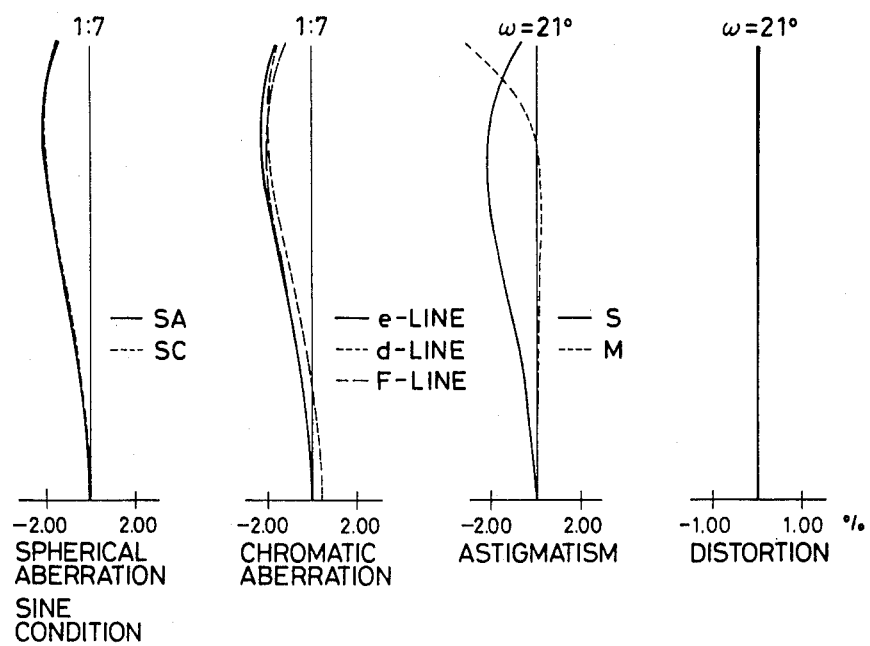
Figure 43:
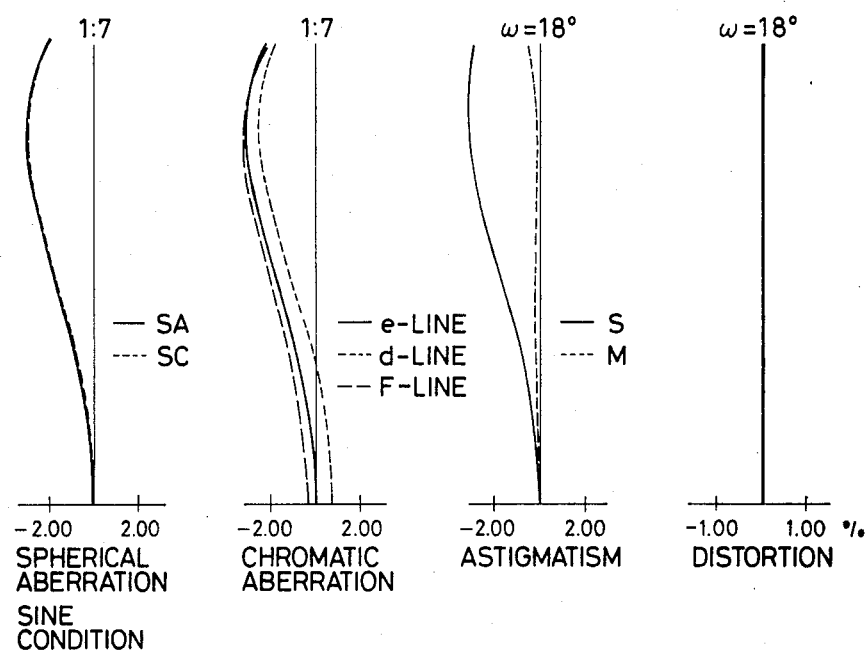
Figure 44:
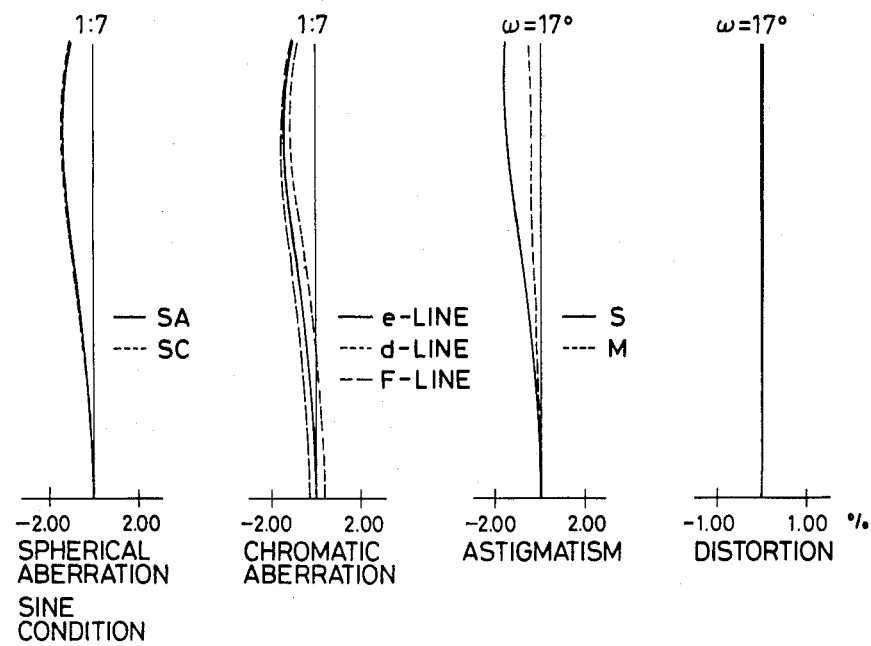
Figure 45:
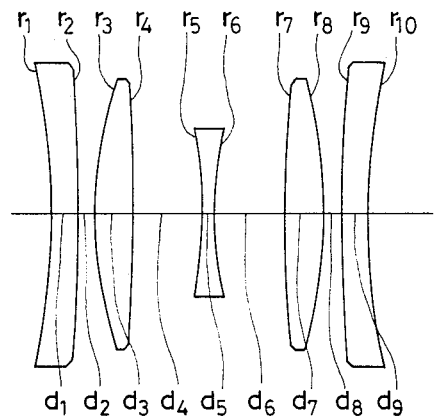
Figure 46:
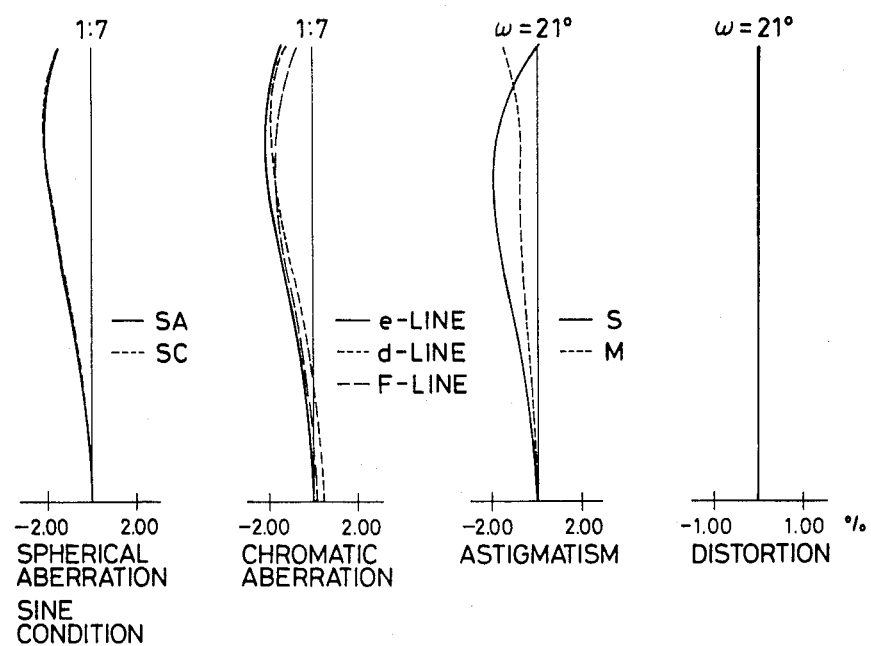
Figure 47:
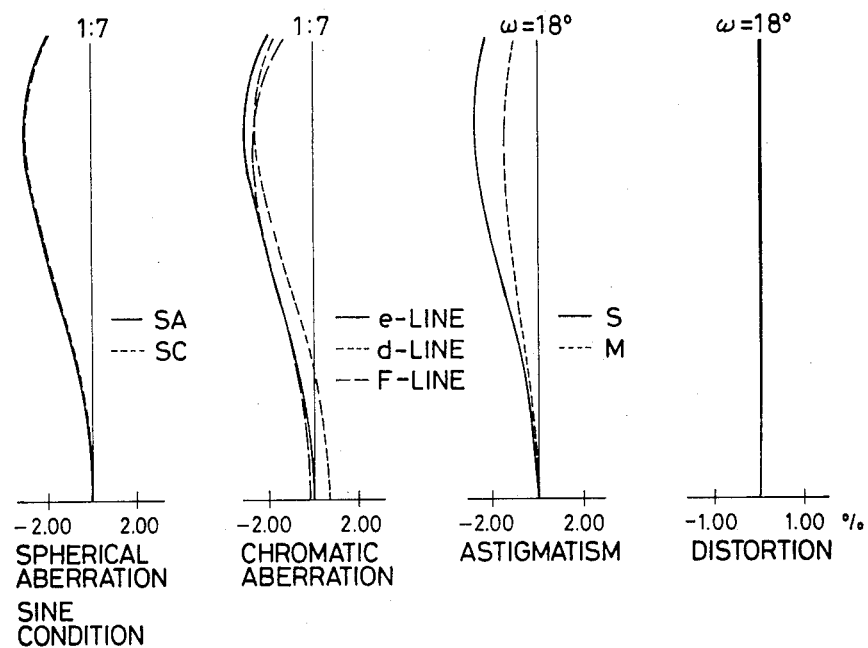
Figure 48:
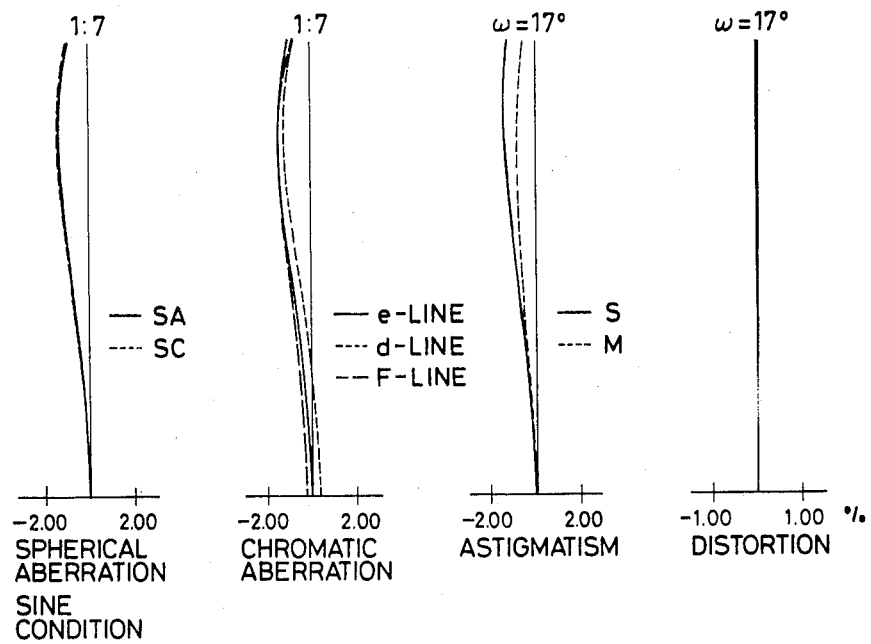

The conditions (1) and (1') are concerned with ratios between the focal length of the second lens unit and the overall focal length. In the three-unit type copying zoom lens, the second lens unit serves primarily to perform the focusing effect and the first and third lens units serve primarily to keep constant the distance between the object and image surfaces while the distances between the first and second lens units and the second and third lens units are varied to change the overall focal length. If the upper limit of the condition (1) or (1') would be exceeded, a refractive power of the second lens unit would be small, so that aberration correction within the second lens unit may be availably performed but the movement of the first and third lens units is unduly large. This is undesirable for making the system compact. Inversely, if the lower limit would be exceeded, the refractive power of the second lens unit would be large. Therefore, it would be possible to suppress the movement of the first and third lens units concomitant with the zooming operation. However, it would be difficult to suppress the generation of the aberration within the second lens group with a desirable result. At the same time, a sensitivity of each lens unit would be too large, which would lead to a difficulty in manufacturing the lens.

The conditions (2) and (3) or (2') and (3') relate to the negative meniscus lenses arranged in the first and third lens units. Since the first lens unit or the second lens unit is composed solely of a single lens element, it is difficult to compensate largely for residual aberration of the second lens unit by using the first and third lens units. Therefore, the conditions (2) and (3) ( (2') and (3') ) are defined to enable to change the overall focal length during the zooming operation while keeping constant the distance between the object and image surfaces, without degrading the various aberrations corrected well by the second lens unit.

The condition (2) or (2') is concerned with the radii of curvature of the negative meniscus lenses of the first and third lens units. The radii of curvature of the specified concave surfaces of the two negative meniscus lenses are suppressed within the limitation of the condition (2) or (2'), so that the various aberrations that have been well corrected in the first lens unit may be maintained to suppress the variation in aberration at a desired level during the zooming operation. If the lower limit would be exceeded, in particular, astigmatism would be worse and there would be a large variation in astigmatism during the zooming operation.

The condition (3) or (3') is concerned with the chromatic aberration of the first and third lens units. According to the present invention, since each of the first and third lens unit is composed of a single lens element, it is difficult or impossible to perform the chromatic aberration correction within the first and third lens units. Accordingly, it is necessary to suppress the generation of the chromatic aberration as much as possible within the first and third lens units. To meet the requirement of the condition (3) and (3'), it is possible to keep the chromatic aberrationA in a good condition without degrading the chromatic aberration well corrected within the second lens unit.

As described above, since each of the first and third lens units is each composed of a single lens element, it is difficult to correct the aberration solely with the single lens. Therefore, it is preferable that the aberration be corrected satisfactorily within the second lens unit. The conditions (4) to (6) or (4') to (6') are needed for suitably distibuting refractive powers to the respective lens elements in the second lens unit to correct with good balance the various aberrations such as flatness of image and chromatic aberraion, which are important factors for the copying lens.

The condition (4) or (4') relates to a Petzval's sum of the second lens unit. The condition is used to correct the Petzval's sum within the second lens unit in order to obtain a satisfactory flatness of the image overa wide view angle, which is an important factor for the copying lens. If the upper limit of the condition (4) or (4') is exceeded, the sum of Petzval is increased so that it would be difficult to obtain the flat image surface. Inversely, if the lower limit is exceeded powers of the respective lens elements are increased, so that it would be difficult to compensate for the various aberration such as spherical aberration and coma aberration to satisfactory levels.

The condition (5) to (5') relates to the correction of the chromatic aberraion within the second lens unit.

Since each of the first and third lens units is composed of a single lens element, to sufficiently suppress the chromatic aberration variation concomitant with the zooming operation, it is necessary to sufficiently compensate for the chromatic aberration that has been generated within the second lens unit. If the upper or lower limit would be exceeded, the chromatic aberration generated in the second lens unit would be too large, so that the chromatic aberration variation concomitant with the zooming operation would be remarkable.

The condition (6) or (6') relates to the powers of two positive lens elements of the second lens unit. When the upper or lower limit is exceeded, it is difficult to compensate for the spherical aberration, coma aberration, and atigmatism in good conditions in the second lens unit.

The condition (7) or (7') relates to a difference in refractive index between the positive lenses and the negative lens(es) of the second lens unit. If the difference in refractive index between the positive lens elements and the negative lens element(s) of the second lens unit is suppressed within the range defined by the condition (7) or (7'), it is possible to ensure a flat image plane and a wide image circle that are important factors for the good copying lens.

The condition (8) relates to ratios of the curvature radii of the adjacent lens surfaces of the positive and negative lens elements in the second lens unit. If the radius relation is limited within the range defined by the condition (8), it is possible to compensate, with good balance, for the spherical aberration, coma aberration and astigmatism. If the upper limit would be exceeded, it would be difficult to compensate for the coma aberration and the astigmatism in good conditions. Inversely, if the lower limit would be exceeded, the correction of the spherical aberration would be insufficient.

The condition (9) relates to an axial distance between the positive lens elements and the negative lens element in the second lens unit. If the upper limit of the condition (9) would be exeeded, although available to compensate for the aberrations, the size of the second lens unit would be enlarged. This is incompatible to the compact system. Inversely, if the lowerA limit would be exceeded, it would be difficult to compensate for the spherical aberration and the coma aberration.

As describedn above, according to the present invention, the copying zoom lens if of the symmetrical six- or five- unit type. Thus, the overall lens system may be formed of substantially three units, which is remarkably simple and advantageous in manufacturing cost while ensuring the satisfactory performance.

DESCRIPTION OF THE PREFERRED EMBODIMENTS

The concrete examples of the lens systmes according to the present invention will now be described, in which $F_{NO}$ is the F-number (aperture ratio), $f_M$ is the overall focal length of the zoom lens at a unity magnification, $\omega$ is half the view angle, r is the radius of curvature of each lens surface, d is the lens thickness or the axial space between the adjacent lens elements, n is the refractive index, at a d-line, of each lens, and $\nu$ is the Abbe number of each lens element.

Incidentally, the values related to the focal lengths are calculated on the basis of the values at an e-line.

Example 1
$F_{NO} = 1:7 \quad f_M = 197.75 \quad \omega = 21° \sim 17°$

| Surface No. | r | d | n | $\nu$ |
|---|---|---|---|---|
| 1 | −85.925 | 3.38 | 1.62588 | 35.7 |
| 2 | −179.654 | 3.00∼6.95 | | |
| 3 | 85.802 | 7.59 | 1.69350 | 53.2 |
| 4 | −94.993 | 6.32 | | |
| 5 | −59.422 | 3.00 | 1.53256 | 45.9 |
| 6 | 618.153 | 6.00 | | |
| 7 | −618.153 | 3.00 | 1.53256 | 45.9 |
| 8 | 59.422 | 6.32 | | |
| 9 | 94.993 | 7.59 | 1.69350 | 53.2 |
| 10 | −85.802 | 3.33∼7.73 | | |
| 11 | 179.654 | 3.38 | 1.62588 | 35.7 |
| 12 | 85.925 | | | |

(1) $f_H/f_M = 0.458$ (2) $r_1/f_1 = -r_{12}/f_6 = 0.324$ (3) $\dfrac{1}{\nu_1 \cdot f_1} = \dfrac{1}{\nu_6 \cdot f_6} = -0.000106$ (4) $\sum\limits_{i=2}^{5} \dfrac{1}{n_i \cdot f_i} = 0.00503$ (5) $\sum\limits_{i=2}^{5} \dfrac{1}{\nu_i \cdot f_i} = 0.000140$ (6) $f_2/f_H = f_5/f_H = 0\ 0.727$ (7) $\dfrac{n_2 + n_5}{2} - \dfrac{n_3 + n_4}{2} = 0.161$ (8) $r_5/r_4 = r_8/r_9 = 0.626$ Example 2
$F_{NO} = 1:7 \quad f_M = 197.44 \quad \omega = 21° \sim 17°$

| Surface No. | r | d | n | $\nu$ |
|---|---|---|---|---|
| 1 | −107.612 | 6.25 | 1.74077 | 27.8 |
| 2 | −188.021 | 3.00∼8.84 | | |
| 3 | 70.187 | 6.35 | 1.72000 | 43.7 |
| 4 | −136.124 | 7.20 | | |
| 5 | −66.981 | 2.00 | 1.62004 | 36.3 |
| 6 | 307.104 | 4.00 | | |
| 7 | −307.104 | 2.00 | 1.62004 | 36.3 |
| 8 | 66.981 | 7.20 | | |
| 9 | 136.124 | 6.35 | 1.72000 | 43.7 |
| 10 | −70.187 | 3.33∼9.82 | | |
| 11 | 188.021 | 6.25 | 1.74077 | 27.8 |
| 12 | 107.612 | | | |

(1) $f_H/f_M = 0.527$ (2) $r_1/f_1 = -r_{12}/f_6 = 0.309$ (3) $\dfrac{1}{\nu_1 \cdot f_1} = \dfrac{1}{\nu_6 \cdot f_6} = -0.000103$ (4) $\sum\limits_{i=2}^{5} \dfrac{1}{n_i \cdot f_i} = 0.00390$ (5) $\sum\limits_{i=2}^{5} \dfrac{1}{\nu_i \cdot f_i} = 0.000080$ (6) $f_2/f_H = f_5/f_H = 0.623$ (7) $\dfrac{n_2 + n_5}{2} - \dfrac{n_3 + n_4}{2} = 0.100$ (8) $r_5/r_4 = r_8/r_9 = 0.492$

Example 3
$F_{NO} = 1:7$  $f_M = 198.77$  $\omega = 21° \sim 17°$

| Surface No. | r | d | n | $\nu$ |
|---|---|---|---|---|
| 1 | −140.924 | 2.20 | 1.60342 | 38.0 |
| 2 | −227.022 | 3.00~15.02 | | |
| 3 | 60.624 | 6.31 | 1.65160 | 58.5 |
| 4 | −135.006 | 5.19 | | |
| 5 | −68.202 | 2.28 | 1.54072 | 47.2 |
| 6 | 121.655 | 4.55 | | |
| 7 | −121.655 | 2.28 | 1.54072 | 47.2 |
| 8 | 68.202 | 5.19 | | |
| 9 | 135.006 | 6.31 | 1.65160 | 58.5 |
| 10 | −60.624 | 3.33~16.69 | | |
| 11 | 227.022 | 2.20 | 1.60342 | 38.0 |
| 12 | 140.924 | | | |

(1) $f_H/f_M = 0.643$ (2) $r_1/f_1 = -r_{12}/f_6 = 0.228$ (3) $\dfrac{1}{\nu_1 \cdot f_1} = \dfrac{1}{\nu_6 \cdot f_6} = -0.000042$ (4) $\sum\limits_{i=2}^{5} \dfrac{1}{n_i \cdot f_i} = 0.00248$ (5) $\sum\limits_{i=2}^{5} \dfrac{1}{\nu_i \cdot f_i} = -0.000001$ (6) $f_2/f_H = f_5/f_H = 0.506$ (7) $\dfrac{n_2 + n_5}{2} - \dfrac{n_3 + n_4}{2} = 0.111$ (8) $r_5/r_4 = r_8/r_9 = 0.505$

Example 4
$F_{NO} = 1:7$  $f_M = 198.23$  $\omega = 21° \sim 17°$

| Surface No. | r | d | n | $\nu$ |
|---|---|---|---|---|
| 1 | −132.475 | 3.20 | 1.54072 | 47.2 |
| 2 | −243.911 | 3.00~13.15 | | |
| 3 | 64.263 | 6.37 | 1.70000 | 48.1 |
| 4 | −113.024 | 3.72 | | |
| 5 | −69.558 | 3.23 | 1.60342 | 38.0 |
| 6 | 122.863 | 6.45 | | |
| 7 | −122.863 | 3.23 | 1.60342 | 38.0 |
| 8 | 69.558 | 3.72 | | |
| 9 | 113.204 | 6.37 | 1.70000 | 48.1 |
| 10 | −64.263 | 3.33~14.61 | | |
| 11 | 243.911 | 3.20 | 1.54072 | 47.2 |
| 12 | 132.475 | | | |

(1) $f_H/f_M = 0.615$ (2) $r_1/f_1 = -r_{12}/f_6 = 0.246$ (3) $\dfrac{1}{\nu_1 \cdot f_1} = \dfrac{1}{\nu_6 \cdot f_6} = -0.000039$ (4) $\sum\limits_{i=2}^{5} \dfrac{1}{n_i \cdot f_i} = 0.00274$ (5) $\sum\limits_{i=2}^{5} \dfrac{1}{\nu_i \cdot f_i} = -0.000021$ (6) $f_2/f_H = f_5/f_H = 0.485$ (7) $\dfrac{n_2 + n_5}{2} - \dfrac{n_3 + n_4}{2} = 0.097$ (8) $r_5/r_4 = r_8/r_9 = 0.615$

Example 5
$F_{NO} = 1:7$  $f_M = 198.48$  $\omega = 21° \sim 17°$

| Surface No. | r | d | n | $\nu$ |
|---|---|---|---|---|
| 1 | −160.087 | 2.50 | 1.80518 | 25.4 |
| 2 | −212.768 | 3.00~19.91 | | |
| 3 | 59.136 | 6.23 | 1.73400 | 51.5 |
| 4 | −123.386 | 2.90 | | |
| 5 | −74.793 | 2.00 | 1.63930 | 44.9 |
| 6 | 84.084 | 8.25 | | |
| 7 | −93.147 | 2.00 | 1.63930 | 44.9 |
| 8 | 78.517 | 2.90 | | |
| 9 | 124.973 | 6.23 | 1.73400 | 51.5 |
| 10 | −59.120 | 3.33~22.12 | | |
| 11 | 212.768 | 2.50 | 1.80518 | 25.4 |
| 12 | 160.087 | | | |

(1) $f_{II}/f_M = 0.704$ (2) $r_1/f_1 = -r_{12}/f_6 = 0.197$ (3) $\dfrac{1}{\nu_1 \cdot f_1} = \dfrac{1}{\nu_6 \cdot f_6} = -0.000048$ (4) $\sum\limits_{i=2}^{5} \dfrac{1}{n_i \cdot f_i} = 0.00173$ (5) $\sum\limits_{i=2}^{5} \dfrac{1}{\nu_i \cdot f_i} = 0.000004$ (6) $f_2/f_{II} = 0.394$, $f_5/f_{II} = 0.395$ (7) $\dfrac{n_2 + n_5}{2} - \dfrac{n_3 + n_4}{2} = 0.095$ (8) $r_5/r_4 = 0.606$, $r_8/r_9 = 0.628$

Example 6
$F_{NO} = 1:7$  $f_M = 198.27$  $\omega = 21° \sim 17°$

| Surface No. | r | d | n | $\nu$ |
|---|---|---|---|---|
| 1 | −80.002 | 2.60 | 1.58144 | 40.7 |
| 2 | −198.716 | 3.00~6.21 | | |
| 3 | 83.317 | 6.65 | 1.69680 | 55.5 |
| 4 | −94.633 | 7.57 | | |
| 5 | −53.975 | 2.00 | 1.58267 | 46.4 |
| 6 | −329.112 | 3.41 | | |
| 7 | −424.533 | 2.00 | 1.58267 | 46.4 |
| 8 | 59.209 | 7.57 | | |
| 9 | 103.883 | 6.65 | 1.69680 | 55.5 |
| 10 | −71.846 | 3.33~6.89 | | |
| 11 | 198.716 | 2.60 | 1.58144 | 40.7 |
| 12 | 80.002 | | | |

(1) $f_{II}/f_M = 0.420$ (2) $r_1/f_1 = -r_{12}/f_6 = 0.347$ (3) $\dfrac{1}{\nu_1 \cdot f_1} = \dfrac{1}{\nu_6 \cdot f_6} = -0.000106$ (4) $\sum\limits_{i=2}^{5} \dfrac{1}{n_i \cdot f_i} = 0.00588$ (5) $\sum\limits_{i=2}^{5} \dfrac{1}{\nu_i \cdot f_i} = 0.000134$ (6) $f_2/f_{II} = 0.772$, $f_5/f_{II} = 0.741$ (7) $\dfrac{n_2 + n_5}{2} - \dfrac{n_3 + n_4}{2} = 0.114$ (8) $r_5/r_4 = 0.570$, $r_8/r_9 = 0.570$

Example 7
$F_{NO} = 1:7$  $f_M = 197.94$  $\omega = 21° \sim 17°$

| Surface No. | r | d | n | ν |
|---|---|---|---|---|
| 1 | −79.419 | 2.80 | 1.58267 | 46.4 |
| 2 | −192.144 | 3.00~6.25 | | |
| 3 | 68.193 | 7.50 | 1.70000 | 48.1 |
| 4 | −104.152 | 7.49 | | |
| 5 | −55.476 | 4.76 | 1.62588 | 35.7 |
| 6 | 55.476 | 7.49 | | |
| 7 | 104.152 | 7.50 | 1.70000 | 48.1 |
| 8 | −68.193 | 3.33~6.94 | | |
| 9 | 192.144 | 2.80 | 1.58267 | 46.4 |
| 10 | 79.419 | | | |

(1') $f_{II}/f_M = 0.420$
(2') $r_1/f_1 = -r_{10}/f_5 = 0.340$ (3') $\dfrac{1}{\nu_1 \cdot f_1} = \dfrac{1}{\nu_5 \cdot f_5} = -0.000092$ (4') $\sum\limits_{i=2}^{4} \dfrac{1}{n_i \cdot f_i} = 0.00552$ (5') $\sum\limits_{i=2}^{4} \dfrac{1}{\nu_i \cdot f_i} = 0.000050$ (6') $f_2/f_{II} = f_4/f_{II} = 0.717$ (7') $\dfrac{n_2 + n_4}{2} - n_3 = 0.074$ (9) $d_4/f_{II} = d_6/f_{II} = 0.090$

Example 8
$F_{NO} = 1:7$  $f_M = 198.11$  $\omega = 21° \sim 17°$

| Surface No. | r | d | n | ν |
|---|---|---|---|---|
| 1 | −84.916 | 4.00 | 1.54814 | 45.8 |
| 2 | −212.034 | 3.00~6.82 | | |
| 3 | 62.505 | 7.50 | 1.63854 | 55.4 |
| 4 | −110.689 | 8.75 | | |
| 5 | −53.105 | 2.51 | 1.57309 | 42.6 |
| 6 | 53.105 | 8.75 | | |
| 7 | 110.689 | 7.50 | 1.63854 | 55.4 |
| 8 | −62.505 | 3.33~7.58 | | |
| 9 | 212.034 | 4.00 | 1.54814 | 45.8 |
| 10 | 84.916 | | | |

(1') $f_{II}/f_M = 0.449$
(2') $r_1/f_1 = -r_{10}/f_5 = 0.327$ (3') $\dfrac{1}{\nu_1 \cdot f_1} = \dfrac{1}{\nu_5 \cdot f_5} = -0.000084$ (4') $\sum\limits_{i=2}^{4} \dfrac{1}{n_i \cdot f_i} = 0.00535$ (5') $\sum\limits_{i=2}^{4} \dfrac{1}{\nu_i \cdot f_i} = 0.000056$ (6') $f_2/f_{II} = f_4/f_{II} = 0.711$ (7') $\dfrac{n_2 + n_4}{2} - n_3 = 0.065$ (9) $d_4/f_{II} = d_6/f_{II} = 0.098$

Example 9
$F_{NO} = 1:7$  $f_M = 198.08$  $\omega = 21° \sim 17°$

| Surface No. | r | d | n | ν |
|---|---|---|---|---|
| 1 | −85.879 | 2.39 | 1.62004 | 36.3 |
| 2 | −188.760 | 2.70~6.41 | | |
| 3 | 70.841 | 8.50 | 1.70000 | 48.1 |
| 4 | −115.655 | 8.63 | | |
| 5 | −57.272 | 4.50 | 1.60342 | 38.0 |
| 6 | 57.272 | 8.63 | | |
| 7 | 115.655 | 8.50 | 1.70000 | 48.1 |
| 8 | −70.841 | 3.00~7.21 | | |
| 9 | 188.760 | 2.39 | 1.62004 | 36.3 |
| 10 | 85.879 | | | |

(1') $f_H/f_M = 0.442$
(2') $r_1/f_1 = -r_{10}/f_5 = 0.337$ (3') $\dfrac{1}{\nu_1 \cdot f_1} = \dfrac{1}{\nu_5 \cdot f_5} = -0.000108$ (4') $\sum\limits_{i=2}^{4} \dfrac{1}{n_i \cdot f_i} = 0.00506$ (5') $\sum\limits_{i=2}^{4} \dfrac{1}{\nu_i \cdot f_i} = 0.000087$ (6') $f_2/f_H = f_4/f_H = 0.725$ (7') $\dfrac{n_2 + n_4}{2} - n_3 = 0.097$ (9) $d_4/f_H = d_6/f_H = 0.098$

Example 10
$F_{NO} = 1:7$  $f_M = 198.56$  $\omega = 21° \sim 17°$

| Surface No. | r | d | n | ν |
|---|---|---|---|---|
| 1 | −90.236 | 4.00 | 1.54072 | 47.2 |
| 2 | −208.129 | 2.50~7.11 | | |
| 3 | 63.213 | 6.61 | 1.63854 | 55.4 |
| 4 | −128.396 | 10.02 | | |
| 5 | −54.634 | 2.00 | 1.58144 | 40.7 |
| 6 | 55.930 | 10.02 | | |
| 7 | 131.315 | 6.61 | 1.63854 | 55.4 |
| 8 | −60.939 | 2.78~7.90 | | |
| 9 | 208.129 | 4.00 | 1.54072 | 47.2 |
| 10 | 90.236 | | | |

(1') $f_H/f_M = 0.480$
(2') $r_1/f_1 = -r_{10}/f_5 = 0.304$ (3') $\dfrac{1}{\nu_1 \cdot f_1} = \dfrac{1}{\nu_5 \cdot f_5} = -0.000071$ (4') $\sum\limits_{i=2}^{4} \dfrac{1}{n_i \cdot f_i} = 0.00492$ (5') $\sum\limits_{i=2}^{4} \dfrac{1}{\nu_i \cdot f_i} = 0.000021$ (6') $f_2/f_H = 0.702$, $f_4/f_H = 0.689$ (7') $\dfrac{n_2 + n_4}{2} - n_3 = 0.057$ (9) $d_4/f_H = d_6/f_H = 0.105$

Example 11
$F_{NO} = 1:7$  $f_M = 199.19$  $\omega = 21° \sim 17°$

| Surface No. | r | d | n | ν |
|---|---|---|---|---|
| 1 | −110.984 | 4.00 | 1.51454 | 54.7 |
| 2 | −226.982 | 2.00~9.60 | | |
| 3 | 63.708 | 6.70 | 1.63854 | 55.4 |
| 4 | −185.609 | 12.59 | | |

-continued

Example 11
$F_{NO} = 1{:}7 \quad f_M = 199.19 \quad \omega = 21° \sim 17°$

|   | r | d | n | ν |
|---|---|---|---|---|
| 5 | −61.808 | 2.00 | 1.60342 | 38.0 |
| 6 | 60.827 | 12.59 | | |
| 7 | 178.712 | 6.70 | 1.63854 | 55.4 |
| 8 | −64.060 | 2.22∼10.66 | | |
| 9 | 226.982 | 4.00 | 1.51454 | 54.7 |
| 10 | 110.984 | | | |

(1') $f_H/f_M = 0.571$ (2') $r_1/f_1 = -r_{10}/f_5 = 0.261$ (3') $\dfrac{1}{\nu_1 \cdot f_1} = \dfrac{1}{\nu_5 \cdot f_5} = -0.000043$ (4') $\sum\limits_{i=2}^{4} \dfrac{1}{n_i \cdot f_i} = 0.00395$ (5') $\sum\limits_{i=2}^{4} \dfrac{1}{\nu_i \cdot f_i} = -0.000040$ (6') $f_2/f_H = 0.658, \; f_4/f_H = 0.653$ (7') $\dfrac{n_2 + n_4}{2} - n_3 = 0.035$ (9') $d_4/f_H = d_6/f_H = 0.111$

Example 12
$F_{NO} = 1{:}7 \quad f_M = 198.87 \quad \omega = 21° \sim 17°$

| Surface No. | r | d | n | ν |
|---|---|---|---|---|
| 1 | −104.947 | 4.03 | 1.48749 | 70.2 |
| 2 | −235.416 | 2.50∼9.25 | | |
| 3 | 60.122 | 6.09 | 1.74100 | 52.7 |
| 4 | −302.566 | 11.01 | | |
| 5 | −80.770 | 2.00 | 1.74950 | 35.3 |
| 6 | 60.253 | 11.01 | | |
| 7 | 171.351 | 6.09 | 1.74100 | 52.7 |
| 8 | −73.577 | 2.78∼10.27 | | |
| 9 | 235.416 | 4.03 | 1.48749 | 70.2 |
| 10 | 104.947 | | | |

(1') $f_H/f_M = 0.546$ (2') $r_1/f_1 = -r_{10}/f_5 = 0.268$ (3') $\dfrac{1}{\nu_1 \cdot f_1} = \dfrac{1}{\nu_5 \cdot f_5} = -0.000036$ (4') $\sum\limits_{i=2}^{4} \dfrac{1}{n_i \cdot f_i} = 0.00411$ (5') $\sum\limits_{i=2}^{4} \dfrac{1}{\nu_i \cdot f_i} = -0.000072$ (6') $f_2/f_H = 0.625, \; f_4/f_H = 0.643$ (7') $\dfrac{n_2 + n_4}{2} - n_3 = -0.009$ (9') $d_4/f_H = d_6/f_H = 0.101$

I claim:

1. A copying zoom lens comprising, in order from the object side, a first lens unit having a negative focal length, a second lens unit having a positive focal length and a third lens unit having a negative focal length, wherein an axial space between said first and second lens units and an axial space between said second and third lens units are varied while moving an overall lens system and keeping constant a distance between the object and an image surface, thereby performing a zoom effect, said zoom lens characterized in that said first lens unit is composed of a single negative meniscus first lens element having a concave surface directed to the object, said second lens unit is composed, in order from the object, of a positive second lens element, a negative third lens element, a negative fourth lens element and a positive fifth lens element to constitute a four-lens element subsystem, said third lens unit is composed of a single negative meniscus sixth lens having a concave surface directed to the image surface, whereby the overall lens system is formed into a six-element lens, said zoom lens satisfying the following conditions:

$$0.3 < f_{II}/f_M < 0.9 \qquad (1)$$

where $f_M$ is the overall focal length at a unity magnification, and $f_{II}$ is the focal length of the second lens unit.

2. The zoom lens according to claim 1, wherein the first and sixth lens elements that are the negative meniscus lenses of the first and third lens units meet the following conditions:

$$0.1 < r_1/f_1 < 0.45, \; 0.1 < -r_{12}/f_6 < 0.45 \text{ and} \qquad (2)$$

$$-0.0002 < 1/(\nu_1 \cdot f_1) < 0, \; -0.0002 < 1/(\nu_6 \cdot f_6) < 0 \qquad (3)$$

where $f_i$ if the focal length of the i-th lens element, $\nu_i$ is the Abbe number of the i-th lens element, and $r_i$ is the radius of curvature of the i-th lens surface counted from the object.

3. The zoom lens according to claim 1, wherein the second lens unit meets the following conditions:

$$0 < \sum_{i=2}^{5} 1/(n_i \cdot f_i) < 0.008 \qquad (4)$$

$$\left| \sum_{i=2}^{5} 1/(\nu_i \cdot f_i) \right| < 0.0002 \text{ and} \qquad (5)$$

$$0.2 < f_2/f_{II} < 1.0, \qquad (6)$$

$$0.2 < f_5/f_{II} < 1.0$$

where $f_i$ is the focal length of the i-th lens element, $\nu_i$ is the Abbe number of the i-th lens element, $n_i$ is the refractive index of the i-th lens at a d-line, and $f_{II}$ is the focal length of the second lens unit.

4. The zoom lens according to claim 3, wherein the second lens unit meets the following conditions:

$$0.06 < (n_2+n_5)/2 - (n_3+n_4)/2 < 0.18, \text{ and} \qquad (7)$$

$$0.3 < r_5/r_4 < 0.9, \text{ and } 0.3 < r_8/r_9 < 0.9, \qquad (8)$$

wherein $r_i$ is the radius of curvature of the i-th lens surface counted from the object.

5. The zoom lens according to claim 1, wherein the first and sixth lens elements have the same configuration and are arranged in a symmetrical manner, the second and fifth lens elements have the same configuration and are arranged in a symmetrical manner, and the third and fourth lens have the same configuration and are arranged in a symmetrical manner.

6. A copying zoom lens comprising, in order from the object side, a first lens unit having a negative focal length, a second lens unit having a positive focal length and a third lens unit having a negative focal length, wherein an axial space between said first and second lens units and an axial space between said second and third lens units are varied while moving an overall lens system and keeping constant a distance between the object and an image surface, thereby performing a zoom effect, said zoom lens characterized in that said first lens unit is composed of a single negative meniscus first lens element having a concave surface directed to the object, said second lens unit is composed, in order from the object, of a positive biconvex second lens element, a negative biconcave third lens element, and a positive biconvex fourth lens element to constitute a three-lens element subsystem, said third lens unit is composed of a single negative meniscus fifth lens having a concave surface directed to the image surface, whereby the overall lens system is formed into a five element lens, said zoom lens satisfying the following condition:

$$0.3 < f_{II}/f_M < 0.8 \quad (1')$$

where $f_M$ is the overall focal length at a unity magnification, and $f_{II}$ is the focal length of the second lens unit.

7. The zoom lens according to claim 6, wherein the first and fifth lens element that are the negative meniscus lenses of the first and third lens units meet the following conditions in order to further enhance the performance:

$$0.15 < r_1/f_1 < 0.45, \; 0.15 < -r_{10}/f_5 < 0.45, \quad (2')$$

$$-0.0002 < 1/(\nu_1 \cdot f_1) < 0, \; -0.0002 < 1/(\nu_5 \cdot f_5) < 0 \quad (3')$$

where $f_i$ is the focal length of the i-th lens element, and $\nu_i$ is the Abbe number of the i-th lens elements, and $r_i$ is the radius of curvature of the i-th lens surface counted from the object.

8. The zoom lens according to claim 6, wherein the second lens unit composed of the second, third and fourth lens elements meet the following conditions:

$$0.002 < \sum_{i=2}^{4} 1/(n_i \cdot f_i) < 0.008 \quad (4')$$

$$\left| \sum_{i=2}^{4} 1/(\nu_i \cdot f_i) \right| < 0.0002 \quad (5')$$

$$0.5 < f_2/f_{II} < 0.9, \quad (6')$$

$$0.5 < f_4/f_{II} < 0.9$$

where $f_i$ is the focal length of the i-th lens element, $\nu_i$ is the Abbe number of the i-th lens element, $n_i$ is the refractive index of the i-th lens element of a d-line, and $f_{II}$ is the focal length of the second lens unit.

9. The zoom lens according to claim 8 wherein the second lens unit meets the following conditions:
$$-0.02 < (n_2 + n_4)/2 - n_3 < 0.12, \text{ and}$$
$$0.06 < d_4/f_{II} < 0.14, \text{ and} \quad (7')$$

$$0.06 < d_6/f_{II} < 0.14, \quad (9')$$

wherein $d_i$ is the axial distance between the i-th and the i-th plus 1 lens surfaces counted from the object.

10. The zoom lens according to claim 6, wherein the first and fifth lens elements have the same configuration and the second and fourth lens elements have the same configuration, said first, second, fourth and fifth lens elements being arranged in a symmetrical manner with respect to the third lens element, said third lens element having lens surfaces arranged in a symmetrical manner.

* * * * *